United States Patent
Mazurek

(10) Patent No.: US 10,992,580 B2
(45) Date of Patent: Apr. 27, 2021

(54) INGRESS RATE LIMITING IN ORDER TO REDUCE OR PREVENT EGRESS CONGESTION

(71) Applicant: Cisco Technology, Inc., San Jose, CA (US)

(72) Inventor: Edward D. Mazurek, Mebane, NC (US)

(73) Assignee: CISCO TECHNOLOGY, INC., San Jose, CA (US)

(*) Notice: Subject to any disclaimer, the term of this patent is extended or adjusted under 35 U.S.C. 154(b) by 0 days.

(21) Appl. No.: 15/972,867

(22) Filed: May 7, 2018

(65) Prior Publication Data
US 2019/0342217 A1 Nov. 7, 2019

(51) Int. Cl.
*H04L 12/801* (2013.01)
*H04L 29/08* (2006.01)
*H04L 12/825* (2013.01)
*H04L 12/935* (2013.01)

(52) U.S. Cl.
CPC .......... *H04L 47/12* (2013.01); *H04L 47/11* (2013.01); *H04L 47/25* (2013.01); *H04L 49/30* (2013.01); *H04L 67/1097* (2013.01)

(58) Field of Classification Search
CPC ......... H04L 47/11; H04L 47/12; H04L 47/25; H04L 49/30; H04L 67/1097
See application file for complete search history.

(56) References Cited

U.S. PATENT DOCUMENTS

| | | | | |
|---|---|---|---|---|
| 8,797,877 B1* | 8/2014 | Perla | .................. | H04L 49/90 370/230 |
| 2008/0198746 A1* | 8/2008 | Kwan | .................. | H04L 47/10 370/231 |
| 2009/0113069 A1* | 4/2009 | Prabhakar | ............ | H04L 47/25 709/235 |
| 2009/0116381 A1* | 5/2009 | Kanda | .................. | H04L 47/10 370/229 |

(Continued)

FOREIGN PATENT DOCUMENTS

WO  2015149460 A1  10/2015

OTHER PUBLICATIONS

"Media Access Control (MAC) Bridges and Virtual Bridged Local Area Networks", Amendment 17: Priority-based Flow Control, IEEE Standard for Local and metropolitan are networks, IEEE Computer Society, IEEE Std 802.1Qbb™—2011, (Amendment to IEEE Stf 802.1Q™—2011 as amended by IEEE 802.1Qbe™—2011 and IEEE Std 802.1 Qbc™—2011), Sep. 30, 2011, 40 pages.

(Continued)

*Primary Examiner* — Asad M Nawaz
*Assistant Examiner* — Kai Chang
(74) *Attorney, Agent, or Firm* — Edell, Shapiro & Finnan, LLC

(57) ABSTRACT

A method performed by a network device comprises egressing data from a port of the network device at an egress rate over a link connected to the port, ingressing data into the port at an ingress rate over the link, monitoring at least one indication with respect to the egressing data in order to determine whether the at least one indication is indicative of egress congestion at the port of the network device, and upon determining that the at least one indication is indicative of the egress congestion at the port, limiting the rate of ingress via the port.

20 Claims, 7 Drawing Sheets

(56) References Cited

U.S. PATENT DOCUMENTS

| | | | |
|---|---|---|---|
| 2011/0110232 A1* | 5/2011 | Abraham | H04L 41/5025 370/235 |
| 2011/0182294 A1* | 7/2011 | Lee | H04L 47/34 370/394 |
| 2011/0202650 A1* | 8/2011 | Abraham | H04L 43/026 709/224 |
| 2012/0163175 A1* | 6/2012 | Gupta | H04L 47/10 370/235 |
| 2013/0227163 A1* | 8/2013 | Prabhakar | H04L 43/0882 709/233 |
| 2013/0315065 A1* | 11/2013 | Matsuike | H04L 47/26 370/236 |
| 2014/0022901 A1* | 1/2014 | Suzuki | H04L 49/15 370/235 |
| 2014/0115087 A1* | 4/2014 | Nakajima | H04L 67/1097 709/212 |
| 2015/0200856 A1* | 7/2015 | Hu | H04L 47/122 370/236 |
| 2016/0088083 A1* | 3/2016 | Bharadwaj | H04L 67/1097 709/217 |
| 2016/0173383 A1* | 6/2016 | Liu | H04L 47/30 370/235 |
| 2016/0205008 A1* | 7/2016 | Dasu | H04L 43/0888 709/224 |
| 2016/0277463 A1* | 9/2016 | Nagarajan | H04L 12/18 |
| 2016/0308769 A1* | 10/2016 | VerSteeg | H04L 43/0894 |
| 2017/0257866 A1* | 9/2017 | Chaudhuri | H04L 5/001 |
| 2017/0339075 A1* | 11/2017 | Arad | H04L 49/9084 |
| 2018/0167307 A1* | 6/2018 | Barry | H04L 45/48 |
| 2018/0302329 A1* | 10/2018 | Seely | H04L 47/26 |
| 2018/0316614 A1* | 11/2018 | Liu | H04L 47/12 |
| 2019/0036813 A1* | 1/2019 | Shenoy | H04L 41/5019 |

OTHER PUBLICATIONS

"Slow-Drain Device Detection, Troubleshooting, and Automatic Recovery", White Paper, C11-737315-00, www.cisco.com, Jul. 2016, 61 pages.

"Fibre Channel Protocol for SCSI", FCP REV 1.0, proposal for draft working document, American National Standard for Information Systems, X3T9.2/92-182, Rev 002, FCP Rev 1.00, Nov. 2, 1992, 20 pages.

"A Day in the Lifeof a Fibre Channel Frame", Cisco MDS 9000 Family Switch Architecture, White Paper, Cisco Systems, www. Cisco.com, C11-335077-00, Mar. 2006, 22 pages.

"Fibre Channel—NVME, (FC-NVMe)", Rev 1.13, INCITS 540-201X, T11/Project 540-D/Rev 1.13, INCITS working draft proposed American National Standard for Information Technology, Nov. 21, 2016, 81 pages.

"Fibre Channel", Single-Byte Command Code Sets Mapping Protocol-6, (FC-SB-6), Rev 4.00, INCITS 544-2016, T11/Project 544 Rev 4.00, Aug. 2, 2016, pp. 1-100.

"Fibre Channel", Single-Byte Command Code Sets Mapping Protocol-6, (FC-SB-6), Rev 4.00, INCITS 544-2016, T11/Project 544 Rev 4.00, Aug. 2, 2016, pp. 101-200.

"Fibre Channel—Single-Byte Command Code Sets Mapping Protocol-6", (FC-SB-6), Rev 4.00, INCITS 544-2016, T11/Project 544 Rev 4.00, Aug. 2, 2016, pp. 201-287.

"Fibre Channel—Physical and Signaling Interface (FC-PH)", Rev 4.3, X3.230—199X, X3T11/Project 755D/Rev 4.3, Jun. 1, 1994, American National Standards Institute, ANSI, dpANS X3.230-199x, pp. 1-100.

"Fibre Channel—Physical and Signaling Interface (FC-PH)", Rev 4.3, X3.230—199X, X3T11/Project 755D/Rev 4.3, Jun. 1, 1994, American National Standards Institute, ANSI, dpANS X3.230-199x, pp. 101-200.

"Fibre Channel—Physical and Signaling Interface (FC-PH)", Rev 4.3, X3.230—199X, X3T11/Project 755D/Rev 4.3, Jun. 1, 1994, American National Standards Institute, ANSI, dpANS X3.230-199x, pp. 201-300.

"Fibre Channel—Physical and Signaling Interface (FC-PH)", Rev 4.3, X3.230—199X, X3T11/Project 755D/Rev 4.3, Jun. 1, 1994, American National Standards Institute, ANSI, dpANS X3.230-199x, pp. 301-400.

"Fibre Channel—Physical and Signaling Interface (FC-PH)", Rev 4.3, X3.230—199X, X3T11/Project 755D/Rev 4.3, Jun. 1, 1994, American National Standards Institute, ANSI, dpANS X3.230-199x, pp. 401-478.

"New and Changed Information", Cisco MDS 9000 Family CLI Configuration Guide, OL-18084-01, Cisco MDS NX-OS Release 4.x, www.cisco.com, pp. 1-100.

"New and Changed Information", Cisco MDS 9000 Family CLI Configuration Guide, OL-18084-01, Cisco MDS Nx-Os Release 4.x, www.cisco.com, pp. 101-200.

"New and Changed Information", Cisco MDS 9000 Family CLI Configuration Guide, OL-18084-01, Cisco MDS NX-OS Release 4.x, www.cisco.com, pp. 201-300.

"New and Changed Information", Cisco MDS 9000 Family CLI Configuration Guide, OL-18084-01, Cisco MDS NX-OS Release 4.x, www.cisco.com, pp. 301-400.

"New and Changed Information", Cisco MDS 9000 Family CLI Configuration Guide, OL-18084-01, Cisco MDS NX-OS Release 4.x, www.cisco.com, pp. 401-500.

"New and Changed Information", Cisco MDS 9000 Family CLI Configuration Guide, OL-18084-01, Cisco MDS NX-OS Release 4.x, www.cisco.com, pp. 501-600.

"New and Changed Information", Cisco MDS 9000 Family CLI Configuration Guide, OL-18084-01, Cisco MDS NX-OS Release 4.x, www.cisco.com, pp. 601-700.

"New and Changed Information", Cisco MDS 9000 Family CLI Configuration Guide, OL-18084-01, Cisco MDS NX-OS Release 4.x, www.cisco.com, pp. 701-800.

"New and Changed Information", Cisco MDS 9000 Family CLI Configuration Guide, OL-18084-01, Cisco MDS NX-OS Release 4.x, www.cisco.com, pp. 801-900.

"New and Changed Information", Cisco MDS 9000 Family CLI Configuration Guide, OL-18084-01, Cisco MDS NX-OS Release 4.x, www.cisco.com, pp. 901-1000.

"New and Changed Information", Cisco MDS 9000 Family CLI Configuration Guide, OL-18084-01, Cisco MDS NX-OS Release 4.x, www.cisco.com, pp. 1001-1100.

"New and Changed Information", Cisco MDS 9000 Family CLI Configuration Guide, OL-18084-01, Cisco MDS NX-OS Release 4.x, www.cisco.com, pp. 1101-1200.

"New and Changed Information", Cisco MDS 9000 Family CLI Configuration Guide, OL-18084-01, Cisco MDS NX-OS Release 4.x, www.cisco.com, pp. 1201-1300.

"New and Changed Information", Cisco MDS 9000 Family CLI Configuration Guide, OL-18084-01, Cisco MDS NX-OS Release 4.x, www.cisco.com, pp. 1301-1368.

* cited by examiner

INGRESS RATE LIMITING IN ORDER TO REDUCE OR PREVENT EGRESS CONGESTION

TECHNICAL FIELD

The present disclosure generally relates to egress congestion, such as in a Fibre Channel (FC) and/or Fibre Channel Over Ethernet (FCoE) Storage Area Network (SAN).

BACKGROUND

Egress congestion at a port of a network device such as a switch may occur when data (e.g. in the form of packets and/or frames) that is supposed to be sent via the port to another device such as an end device, is not being sent in an appropriate manner. A low utilization or a high utilization of a link between the network device and the other device (e.g. an end device) may be associated with egress congestion at the port, depending on whether or not other data that is supposed to be sent to the other device is being sent in an appropriate manner and/or the rate of sending such other data, if such other data is being sent. Data that is not being sent via the port in an appropriate manner may be queued in the network device and/or dropped, and additional data that is destined for the other device and has not yet arrived at the network device may be throttled. Back-pressure may be exerted back through the network to the one or more sources of data for the other device. Therefore egress congestion occurring at a port of the network device, may lead to other network congestion, e.g., network congestion anywhere between the source and the other device.

BRIEF DESCRIPTION OF THE DRAWINGS

So that the present disclosure may be understood by those of ordinary skill in the art, a more detailed description may be had by reference to aspects of some illustrative implementations, some of which are shown in the accompanying drawings. The appended drawings, however, illustrate only some example features of the present disclosure and are therefore not to be considered limiting, for the description may admit to other effective features.

Figure 1A:
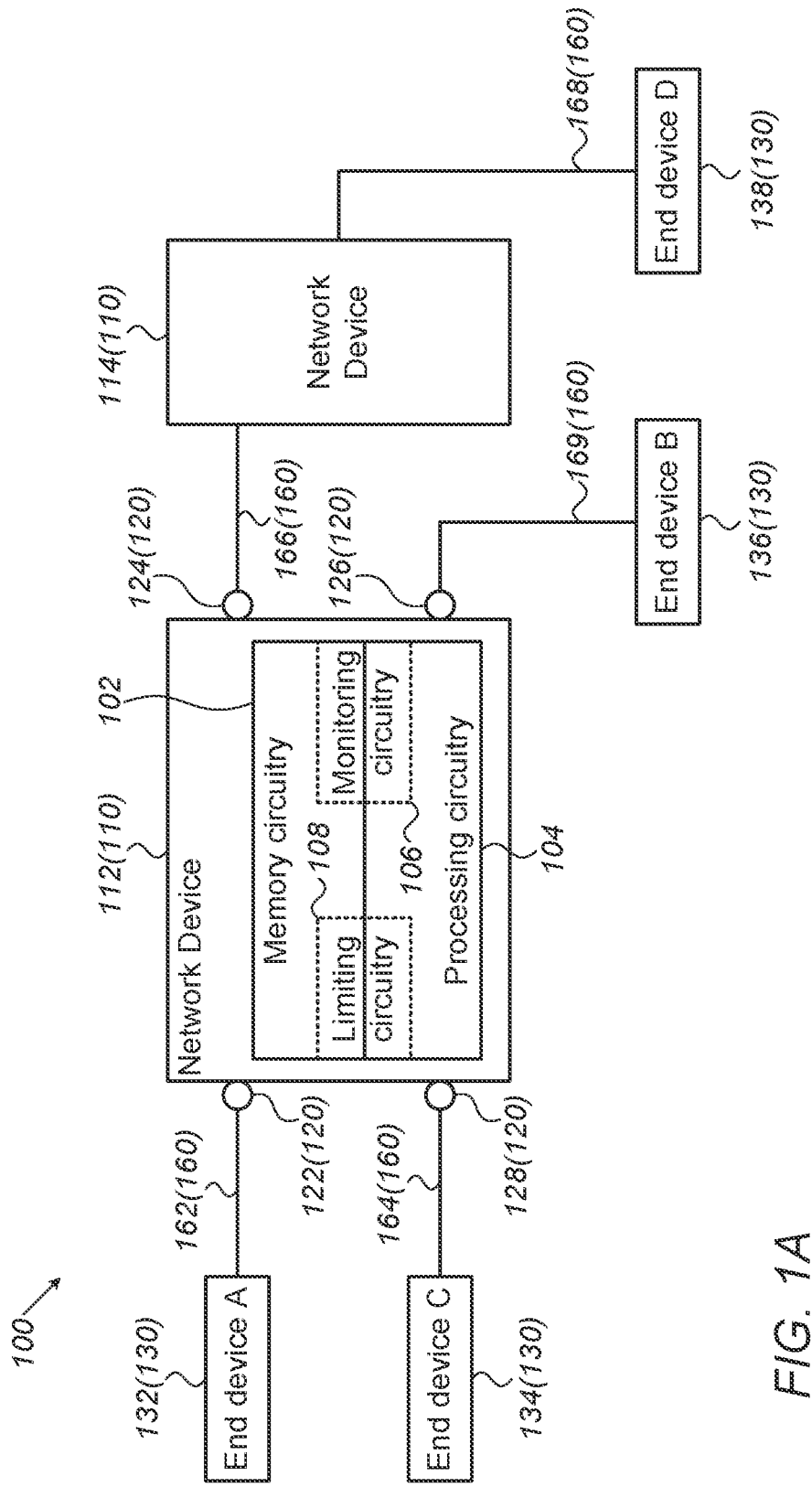
FIG. 1A is a block diagram of a network, in accordance with some embodiments of the presently disclosed subject matter.

In accordance with common practice the various features illustrated in the drawings may not be drawn to scale. Accordingly, the dimensions of the various features may be arbitrarily expanded or reduced for clarity. In addition, some of the drawings may not depict all of the blocks and/or stages, etc. of a network, method, and/or network device, etc.

DESCRIPTION OF EXAMPLE EMBODIMENTS

Overview

There is provided, in accordance with some embodiments of the presently disclosed subject matter, a method performed by a network device comprising egressing data from a port of the network device at an egress rate over a link connected to the port, ingressing data into the port at an ingress rate over the link, monitoring at least one indication with respect to the egressing data in order to determine whether the at least one indication is indicative of egress congestion at the port of the network device, and upon determining that the at least one indication is indicative of the egress congestion at the port, limiting the rate of ingress via the port.

Example Embodiments

FIG. 1A is a block diagram of a network 100, in accordance with some embodiments of the presently disclosed subject matter. Network 100 includes the following devices: Two network devices 110, namely network device 112 and network device 114, and four end devices 130, namely an end device A 132, an end device B 136, an end device C 134, and an end device D 138. Network device 112 is illustrated as having a plurality of ingress/egress ports ("ports") 120, namely port 122, port 124, port 126, and port 128. The ports on other devices in network 100 are not shown in FIG. 1A. Links 160 connect between the various devices shown in FIG. 1A. A link 162 connects between end device A 132 and network device 112, and more specifically connects to port 122 of network device 112. A link 166 connects between network device 114 and network device 112, and more specifically connects to port 124 of network device 112. Such a link 166 may be referred to as an inter-switch link (ISL) if network devices 112 and 114 are switches. A link 169 connects between end device B 136 and network device 112, and more specifically connects to port 126 of network device 112. A link 164 connects between end device C 134 and network device 112, and more specifically connects to port 128 of network device 112. A link 168 connects between end device D 138 and network device 114.

Network device 112 is further illustrated as comprising circuitry which includes memory circuitry 102 and processing circuitry 104. Such circuitry (i.e. memory circuitry 102 and/or processing circuitry 104) may comprise monitoring circuitry 106 and limiting circuitry 108. Processing circuitry 104 and/or memory circuitry 102 are optionally used for other functionality in network device 112. For example, memory circuitry 102 may hold data that ingresses to and/or is to egress out of network device 112. Network device 114 may have similar circuitry as network device 112.

Referring to any particular one of ports 120 (e.g. port 122), and an associated any one of links 160 (e.g. link 162 associated with port 122 and connecting to end device 132), data may be transferred via the associated 160 link in either direction. Depending on the protocol, the data that is transferred via the associated link 160 (e.g. link 162) may be in the form of packets and/or frames, etc. In accordance with some embodiments of the presently disclosed subject matter, monitoring circuitry 106 may be adapted to monitor at least one indication, in order to determine whether the at least one indication is indicative of egress congestion at the particular port 120 (e.g. port 122). The at least one indication which is monitored may include any appropriate indication which may be indicative of egress congestion at the particular port 120. For instance, one or more monitored indications may be associated with latency/delay, retransmission, extreme delay, actual transmission rate, solicited transmission rate, and/or respective statuses of one or more techniques, etc., as will be explained in more detail below with reference to method 300.

Figure 1B:
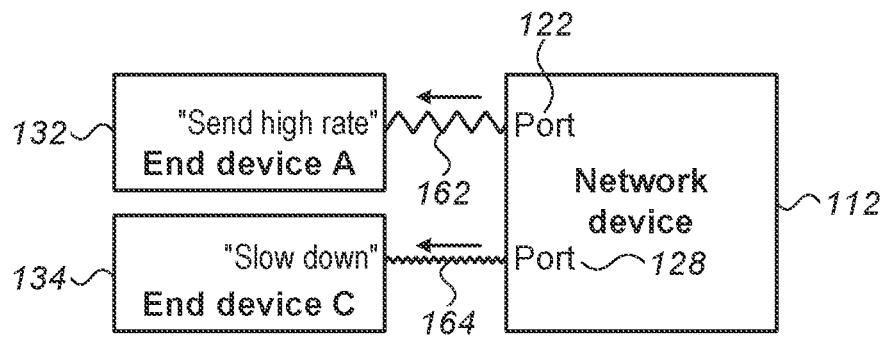
FIGS. 1B, 1C and 1D are block diagrams in accordance with some embodiments of the presently disclosed subject matter.

The monitoring of the at least one indication may lead, for example, to a determination that the at least one indication is indicative of egress congestion at the particular port 120 (e.g. port 122) of network device 112, when there is a high utilization of link 160 (also referred to as overutilization) in the direction from network device 112 to a particular end device 130 or to another network device 110. In such an example, the particular end device 130 or other network device 110 may be referred to as greedy. Refer to FIG. 1B which is a block diagram in accordance with some embodiments of the presently disclosed subject matter. In FIG. 1B, end device A 132 is shown as "greedy", receiving a problematically high rate of data (the high rate being problematic but not exceeding the operating link rate) from port 122 of network device 112.

As another example, when there is a low utilization of a particular link 160 in the direction from network device 112 to a particular end device 130 or to another network device 110, the monitoring of the least one indication may lead to a determination that the at least one indication is indicative of egress congestion at the particular port 120 (e.g. port 128). For instance, there may be specific indications that the particular end device 130 is preventing the network device from sending data. In such an example, the particular end device 130 or other network device 110 may be referred to as slow, slow-drain, slow to accept, etc. Refer again to FIG. 1B where end device C 134 is shown as slow, receiving "slowed down" data, i.e. a low rate of data, from port 128 of network device 112.

In either of the above two examples, if there is egress congestion at a particular port 120 (e.g. port 122 or 128), and assuming that data is not dropped, data that is supposed to egress via the particular port 120 (e.g. data destined for end device A 132 or end device C 134) may remain queued in network device 112, and/or may be throttled, for instance by preventing the data and/or additional data from arriving at network device 112. Therefore egress congestion at a particular port 120, which is an example of network congestion, may lead to additional network congestion. For instance, the additional network congestion may occur anywhere between one or more sources of data for a device (e.g. a particular end device 130 or other network device 110) connected via the particular link 160 to the particular port 120 of network device 112, and such device.

Figure 1C:
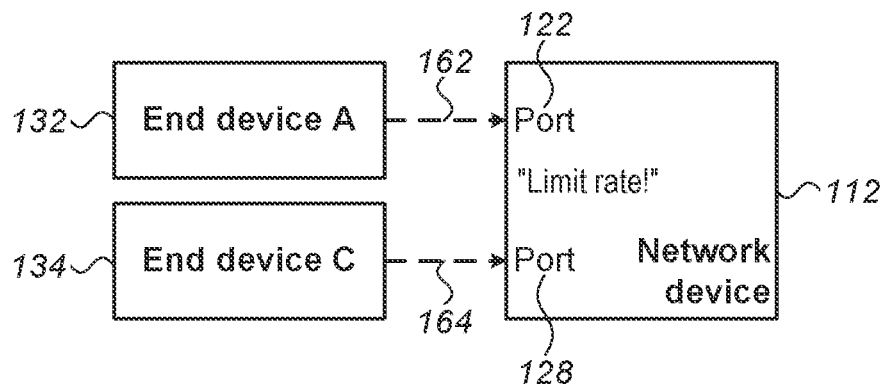

Limiting circuitry 108 may be adapted to limit a rate of ingress via port 122, upon monitoring circuitry 106 determining that the at least one indication is indicative of egress congestion at a particular port 120. For example, the rate of ingress may be limited by limiting the rate of ingress to the current rate of ingress minus a first percentage (e.g. a configurable first percentage) of the current ingress rate. As another example, the rate of ingress may be limited by limiting the rate of ingress to a second configurable percentage of the current ingress rate. Refer to FIG. 1C which is a block diagram in accordance with some embodiments of the presently disclosed subject matter. FIG. 1C shows a limited rate of ingress for each of ports 122 and 128 with respect to data transferred from end device A 132 and end device C 134 respectively, via respective links 162 and 164, due to ingress rate limiting.

Figure 1D:
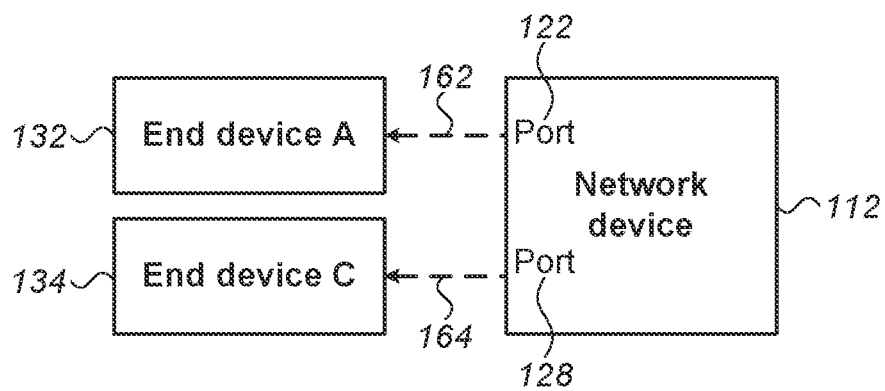

In embodiments where the rate of ingressing data may affect the rate of egressing data, limiting a rate of ingress via a particular port 120 may cause the rate of egress via the particular port 120 to be lower than would be the case if the rate of ingress were not limited, because less data may need to egress via the particular port 120 in a given time interval. It is noted that the egress rate referred to as being lower is the egress rate subsequent to ingress rate limiting versus an egress rate which would have subsequently occurred if there were not ingress rate limiting. The egress rate subsequent to ingress rate limiting may not necessarily be lower than the egress rate prior to ingress rate limiting, e.g. if there was previously low utilization of the particular link 160 associated with the particular port 120 such as for end device C 134 in in FIG. 1B. Refer to FIG. 1D which is a block diagram in accordance with some embodiments of the presently disclosed subject matter. FIG. 1D shows egress rates for ports 122 and 128 after ingress limiting. In FIG. 1D, data is shown egressing in what is assumed to be an appropriate manner, e.g. in a manner which does not lead to egress congestion. It is noted that the terms rate of ingress and ingress rate are used interchangeably herein. The terms rate of egress and egress rate are used interchangeably herein.

Limiting the rate of ingress on a particular port 120 may be especially conducive to causing the rate of egress via the particular port 120 to be lower in embodiments where the data ingressing via the particular port 120 includes commands/messages requesting (or in other words soliciting) data which may then have to egress via the particular port 120. A lower rate of egress at the particular port 120 (than would be the case if there were not ingress rate limiting) may specifically reduce egress congestion at the particular port 120, and more generally may reduce network congestion in network 100. For example, if the particular port 120 is port 122, egress congestion may be specifically reduced at port 122, and network congestion may be more generally reduced anywhere between the one or more sources of data destined for end device A 132 and end device A 132. Because of the lower rate of egress, data in one or more queues (e.g. in queueing buffers in memory circuitry 102 of network device 112) destined for end device A 132, and/or data in memory circuitry in end device A 132 may be emptied out more quickly and/or filled up more slowly, and thus egress congestion via port 122 may be reduced. Additionally or alternatively, back-pressure to the one or more sources (e.g. to end device D 130) of data destined for end device A 130 (e.g. data transferred via network devices 114 and 112), and consequent other network congestion may be reduced if the data in one or more queues in network device 112 that is destined for end device A 130 empties out more quickly or fills up more slowly.

It is noted that in some embodiments, reference to a particular indication being indicative of egress congestion at a particular port 120 may mean that the indication is predictive of egress congestion, or in other words the indication may be indicative of egress congestion before egress congestion actually occurs at the particular port 120. For example, the type of indication being monitored and/or the procedure for determining whether or not the indication is indicative of egress congestion may affect whether or not the indication is determined to be indicative of egress congestion prior to or after egress congestion actually occurs. In such embodiments where a particular indication is predictive of egress congestion, the limiting of the ingress rate at the particular port 120 may prevent egress congestion from occurring at the particular port 120, e.g. rather than reducing egress congestion at the particular port 120. Similarly, prevention or reduction of egress congestion at the particular port 120 may lead to a prevention and/or a reduction of other network congestion.

Optionally, subsequent monitoring of the at least one indication is performed after a limit on the rate of ingress is applied for the particular port 120. If the subsequent monitoring leads to a determination that the at least one indication is indicative of egress congestion at the particular port 120, then the ingress rate via the particular port 120 may again be limited. For example, a previous limit on the rate of ingress via the particular port 120 may be retained (e.g. in case more time is needed for the limit to have an impact on egress congestion, by causing egress congestion to be reduced or prevented). As another example the previous limit on the rate of ingress may be tightened (or in other words the rate of ingress may be further limited). Additionally or alternatively, for instance, subsequent monitoring may lead to a determination that the at least one indication is not indicative of egress congestion. In the latter instance, network device 112 may act in any suitable manner, such as retaining the limit on the ingress rate as before, removing a limit previously applied to the rate of ingress, or loosening a limit previously applied to the rate of ingress.

It is noted that conventionally, network device 112 in network 100 may perform various techniques relating to egress congestion. For example network device 112 may reduce egress congestion at a particular port 120 by dropping data, and/or shutting down the particular port 120, etc. Network device 112 may additionally or alternatively impede egress congestion at the particular port 120 from causing and/or increasing other network congestion by using per destination virtual output queues in order to prevent head of line blocking, and/or by congestion isolation which may isolate one or more poorly performing end devices 130 (e.g. end device A 130) and any other end devices 130 in network 100 that are in the same zone in a separate logical link, etc. A poorly performing end device 130 in network 100 may be an end device 130 that is slow to accept data, or an end device 130 that is greedy to accept data. Due to a slow to accept end device 130, link utilization to the slow to accept end device 130 may be low, while a greedy end device 130 may cause high utilization of a link to the greedy end device 130.

However, such techniques may be problematic, for any number of reasons. For example, data dropping may be problematic if the one or more protocols used in network 100 require all data to reach the one or more destinations thereof. Data dropping may additionally or alternatively cause errors, and/or it may be difficult to optimally drop data so that data is not dropped prematurely or too late. As another example, shutting down a particular port 120 may be disruptive. As another example, virtual output queues may still result in network congestion if substantial data is queued for one or more particular destinations. As another example, under congestion isolation network device 112 may label any end device 130 in network 100 as poorly performing (e.g. slow to accept data, or greedy) or as normal, and not allow a range of performance quality labeling. As mentioned above, any end device 130 in the same zone as a poorly performing end device 130 may also be isolated. Additionally or alternatively, various network devices 110 may be required to communicate to implement the congestion isolation.

Although such techniques described in the previous two paragraphs may be problematic, it is possible that some of such techniques may be applied in addition to or instead of limiting the ingress rate. For example, whether or not network device 112 limits the ingress rate, and/or applies one or more such technique(s) may be configurable. Additionally or alternatively, statuses of one or more of such techniques may be monitored, and may therefore serve as one or more indications of egress congestion.

In some embodiments, the monitoring and limiting by network device 112 may be performed with regard to any port 120 of network device 112. In some other embodiments, the monitoring and limiting may be performed with regard to only a subset of ports 120 of network device 112, e.g., ports 120 in network device 112 that are connected to end devices 130, ports 120 which support one or more particular protocols, ports 120 characterized by any other appropriate characteristics, etc.

Network devices 110 in network 100 may include any appropriate network devices. For example, network device 112 may be a switch, a fabric extender, and/or any other appropriate network device. If network device 112 is a switch, network device 112 may be, for instance, a fixed port "pizza box" switch, or a chassis based switch which includes a plurality of line cards. For a chassis based switch, various ports 120, parts of processing circuitry 104, and/or parts of memory circuitry 102 (and consequently parts of monitoring circuitry 106 and/or limiting circuitry 108) may be associated with the various included line card(s) and optionally with the chassis. For example, a part of the processing circuitry 104 and/or of memory circuitry 102 that is associated with the chassis may be associated with the switch as a whole, and/or with more than one included line card.

End devices 130 in network 100 may include any appropriate end devices. Examples of a particular end device 130 may include a server computer, a storage device, a laptop, a smartphone, a personal computer, an Internet of Things device not traditionally thought of as being in a network (e.g. light, appliance, vehicle, trash can, heating ventilating and air-conditioning (HVAC), window, window shade/blind, door, lock, sensor, actuator, robot, camera, etc.), etc. A particular end device 130 optionally includes a plurality of virtual machines (e.g. the plurality of virtual machines implementing a plurality of servers). In some embodiments, end devices 130 in network 100 may include one or more administrator computers (e.g. end device B 136), where administrator computers are described in more detail below with reference to FIG. 2.

In some embodiments, network 100 may have fewer, more and/or different devices and links than shown in FIG. 1A. For example, network 100 may include one network device 110 or three or more network devices 110, rather than two network devices 110 as shown in FIG. 1A. Network 100 may include less than four or more than four end devices 130, rather than the four end devices 130 shown in FIG. 1A.

Some embodiments may be applicable to any suitable configuration of network 100, to any suitable type of network 100, with regard to any suitable protocol(s) used in network 100. However, for the sake of further illustration, an example will now be described with reference to network 100 being a storage area network.

Figure 2:
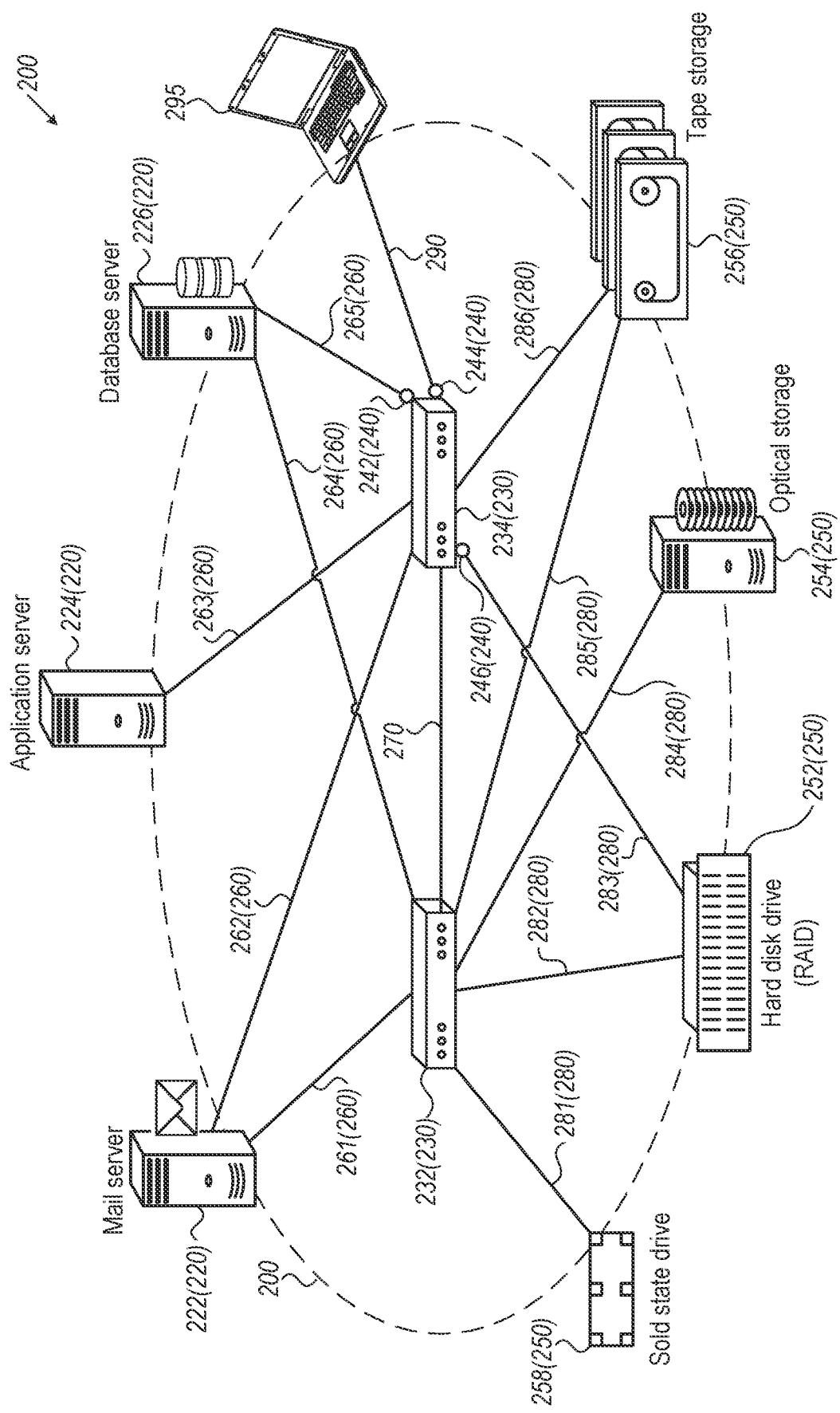
FIG. 2 is a partly pictorial, partly block diagram of a storage area network, in accordance with some embodiments of the presently disclosed subject matter.

FIG. 2 is a partly pictorial, partly block diagram of a storage area network (SAN) 200, in accordance with some embodiments of the presently disclosed subject matter. SAN 200 may be located, for example, in a data center. SAN 200 includes network devices 230, namely two network devices labeled as 232 and 234. Network devices 230 may be examples of network devices 110 of FIG. 1A. Network devices 230 may therefore comprise memory circuitry and processing circuitry (e.g. including monitoring circuitry and limiting circuitry) as discussed above with reference to memory circuitry 102, processing circuitry 104, monitoring circuitry 106 and limiting circuitry 108 of FIG. 1A. The network topology of network 200 may be a switched fabric, where network devices 230 are switches. In some embodiments, a particular switch 230 may be set to switch mode or N-port virtualization (NPV) mode.

Storage area network 200 further comprises end devices 220 and 250, some of which are initiators, and some of which are targets. As illustrated in FIG. 2, there are three server computers 220 that are initiators, namely mail server computer 222, application server computer 224, and database server computer 226. If a particular server computer 220 includes a plurality of virtual machines (e.g. the plurality of virtual machines implementing a plurality of servers), each may act as an individual initiator. As illustrated in FIG. 2, there are four storage devices 250 that are targets, namely tape storage device 256, optical storage device 254, hard disk drive storage device 252 (e.g. using Redundant Array of Independent Disks (RAID) virtualization technology), and solid state drive storage device 258. Optionally, there is an administrator computer 295, for instance for configuring network devices 230. Administrator computer 295 may be an end device (e.g. an initiator) that is part of SAN 200, or administrator computer 295 may not be part of SAN 200 (but may use instead an out of band management network or a console connection). The end devices shown in FIG. 2 may be examples of end devices 130 described above with reference to FIG. 1A.

Three ports 240 on network device 234 are marked, for illustrative purposes, in FIG. 2. Port 242 is connected via a link 265 to database server 226. Port 244 (e.g. console port) is connected via a link 290 (e.g. a console connection) to administrator computer 295. Port 246 is connected via a link 283 to hard disk drive storage device 252. Links 260, namely links 261, 262, 263, 264, and 265 are shown between server computers 220 and network devices 230. Links 280, namely links 281, 282, 283, 284, 285 and 286 are shown between storage devices 250 and network devices 230. Link 270 is shown between network devices 232 and 234.

Network devices 230 may support the Fibre Channel (FC) and/or Fibre channel over Ethernet (FCoE) Protocols. For example, a particular fixed port network device 130 may support the FC protocol and/or the FCoE protocol. As another example, if a particular network device 130 includes a plurality of line cards, at least some of which may support the FC protocol and/or at least some of which may support the FCoE protocol. It is noted that a particular port 240 on a particular network device 230 may support the FC protocol or the FCoE protocol by default or as configured (e.g. if the particular port 240 is a universal port). Optionally, network device 232 and/or 234 support one or more other protocols such as simple network management protocol (SNMP) for collecting information, e.g. for output on administrator computer 295. The FC protocol may be defined, for example, as in the FC-PH T11 revision 4.3 working draft proposed, and/or in any other appropriate document(s) for the FC protocol. The FCoE protocol may be defined, for example, as in IEEE 802.1Qbb 2011 standard, and/or in any other appropriate document(s) for the FCoE protocol. Links 260, 270 and 280 may comprise, for example, optical fiber (e.g. single mode fiber, and/or multi-mode fiber, etc.) and/or copper (e.g. Twinax). If port 244 supports the FC protocol or the FCoE protocol, then link 290 may comprise, for example, optical fiber or copper. In some cases where port 244 supports one or more other protocols, link 290 may comprise, for example, optical fiber or copper, and/or link 290 may be wireless. Similarly, the types of links 160 shown in FIG. 1A may be dependent on the protocols supported by the associated ports.

A small computer system interface (SCSI) protocol, a FICON protocol, and/or a non-volatile memory express protocol (NVMe) may be used for communication in SAN 200. Such protocols may be transported over the FC protocol and/or over the FCoE protocol. Each of the SCSI, FICON, and NVMe protocols includes a specific FC type field, namely SCSI-FCP, FICON, or FC-NVMe, which identifies the protocol which is being transported over the FC protocol and/or over the FCoE protocol. Each of the SCSI, FICON, and NVMe protocols includes commands such as read commands and write commands. A routing control field (RCTL) that is included in a fibre channel header or FCoE header identifies transfer ready messages. An initiator (e.g. database server computer 226) may send a read command to a target (e.g. hard disk drive storage device 252) in order to solicit data. The read command may be transferred from the initiator to the target via one or more network devices 230 (e.g. from database server computer 226, ingressing into port 242, egressing from port 246 to hard disk storage device 252). In response to the read command, data from the target (e.g. hard disk storage device 252) may be transferred to the initiator (e.g. database server computer 226), for instance ingressing into port 246 and egressing from port 242 of network device 234. The read command and the data that is being read may be in the form of frames. Due to the read command that ingresses into a port of network device (e.g. port 242 of network device 234) and thereby solicits the data that is to be read, the data that is being read subsequently egresses from the port (e.g. port 242). It is noted that the read command may ingress into one port 240 of one network device 230, or into two or more ports 240 respectively included in two or more network devices 230, and consequently the data that is being read may egress from the one or more ports 240 into which the read command ingressed.

The initiator may additionally or alternatively send a write command to the target. The write command may be transferred from the initiator to the target via one or more network devices 230 (e.g. from database server computer 226 ingressing into port 242, egressing from port 246 of network device 234 to hard disk storage device 252). In response to the write command, the target may send a transfer ready message to the initiator in order to solicit data that is to be written. The transfer ready message may be transferred via the one or more network devices 230, e.g. ingressing into port 246 and egressing from port 242 of network device 234. The initiator may then send the data to be written to the target. The data to be written may be transferred via one or more network devices 230, e.g. ingressing into port 242 and egressing from port 246 of network device 234. The transfer ready message and data that is being written may be in the form of frames. Due to the transfer ready message that ingresses into a port of network device (e.g. port 246 of network device 234) and thereby solicits the data that is to be written, the data to be written subsequently egresses from the port (e.g. port 246). It is noted that the transfer ready message may ingress into one port 240 of one network device 230, or into two or more ports 240 respectively included in two or more network devices 230, and consequently the data to be written may consequently egress from the one or more ports 240 into which the transfer ready message ingressed. The procedures for reading and writing SCSI data may be as defined in the Fibre Channel Protocol for SCSI REV 1.0—Proposal for Draft Working Document, and/or any other appropriate document(s). The procedures for reading and writing NVMe data may be as defined in the FC-NVMe Rev. 1.13 Working Draft and/or any other appropriate document(s). The procedures for reading and writing FICON data may be as defined in the FC-SB-6 Rev. 4.0 Working Draft and/or any other appropriate document(s).

The FC protocol and the FCoE protocol may implement flow control on a per link (also referred to as per hop) basis. In the SCSI, FICON and/or NVMe protocol(s), any frame loss may be costly and may lead to errors, e.g. on one or more end devices 220 and/or 250 (e.g. end device 226 and/or 252). In the FC protocol each side of a link (e.g. database server computer 226 and network device 234 connected by link 265; or e.g. hard disk drive storage device 252 and network device 234 connected by link 283) may keep track of available buffer memory locations on the other side for storing frames. The tracking of the available buffer memory locations on the other side is referred to as a buffer count (or a transmit buffer-to-buffer credit count). When a frame of data is sent, the sending side (e.g. network device 234) may decrement the buffer count (e.g. by one buffer credit per sent frame). If the sending side reaches a count of zero transmit buffer-to-buffer credits, the sending side ceases sending. The receiving side (e.g. database server computer 226 or hard disk storage device 252) may provide a buffer-to-buffer credit (also referred to as providing a receiver ready or R-ready) to the sending side (e.g. network device 234) once a received frame of data has been removed from a buffer memory location, the removal rendering the buffer memory location available. A particular link (e.g. link 265 or 283) although bi-directional, may be treated as two uni-directional links, each with separate transmit buffer-to-buffer credits for each side of the link. A receiving side may additionally or alternatively keep track of the available memory locations (e.g. ingress queueing buffer locations in memory circuitry) on the receiving side. Such a count is referred to as a receive buffer-to-buffer credits count.

In the FCoE protocol, the flow control mechanism of a bi-directional link (e.g. link 265 or 283) may be treated as two uni-directional links. Each side of a link (e.g. database server computer 226 and network device 234 connected by link 265; or e.g. hard disk drive storage device 252 and network device 234 connected by link 283) may send to the other side unless the sending side receives a notification to pause the transmission for a given amount of time. The notification is referred to as a pause frame, or as a pause. The given amount of time is expressed in quanta, where each of the quanta represents the amount of time it takes to send 512 bits of data at the operating rate of the link. The sending side may only send again if the sending side subsequently receives a subsequent pause frame with zero quanta, or if the (non-zero) quanta in the previous pause frame expired.

Despite the flow control mechanism of the FC protocol or FCoE protocol, network congestion (e.g. anywhere in SAN 200) may occur if frames are not delivered to the receiving side in an appropriate manner. For example, network device 234 may not be able to deliver data to database server computer 226 or to hard disk drive storage device 252, if database server computer 226 or hard disk drive storage device 252 withholds buffer-to-buffer credits from network device 234, or sends pause frames (with non-zero quanta) to network device 234, resulting in egress congestion at port 242 or 246. In such an example, database server computer 226 or hard disk drive storage device 252 may be referred to as a "slow drain device" or any other appropriate terminology such as other terms mentioned above. As another example, database server computer 226 or hard disk drive storage device 252 may solicit an amount of data (e.g. via read command(s) from database server computer 226 or transfer ready(s) from hard disk drive storage device 252, respectively) that is problematically large for a given time interval, resulting in egress congestion at port 242 or 246. A solicited amount of data may be problematically large for a given time interval for any appropriate reason such as: the soliciting end device (e.g. database server computer 226 or hard disk drive storage device 252) removing the data from buffer memory at a lower rate than the end device from which the data is being solicited (e.g. hard disk drive storage device 252 or database server computer 226) sends the data; the rate of soliciting the data being high with respect to the operating link rate; and/or design of SAN 200 (e.g. a plurality of end devices zoned with the soliciting device, and/or a plurality of equal cost data paths between the end device from which the data was solicited and the soliciting end device, etc.); etc. The latter example, where the solicited amount of data in a given time interval is problematically large, may be referred to as a solicited microburst condition, an overutilization condition, or any other appropriate terminology such as other terms mentioned above.

In some embodiments of the presently disclosed subject matter, at least one indication may be monitored by a particular network device 230 (e.g. network device 234), in order to determine if the indication is indicative of egress congestion at a particular port 240 (e.g. port 246 or port 242). For example there may be egress congestion if database server computer 226 or hard disk drive storage device 262 is a slow drain device, or if there is the solicited microburst condition. Upon determining that the at least one indication is indicative of egress congestion at a particular port 240 (e.g. port 246 or 242), the ingress rate via the particular port 240 may be limited. It is noted that there may be at least one respective indication indicative of egress congestion at one or more ports 240 in SAN 200, and consequently the respective one or more ingress rates may be limited at the one or more ports 240. Optionally, the ingress rate is not limited at one or more other ports 240 in SAN 200 at the same time as the one or more ports 240 are ingress rate limited.

The ingress rate of a particular port 240 may be limited using the FC or FCoE mechanism of buffer-to-buffer credits or pause frames, as will be discussed in more detail below. It is noted that limiting the ingress rate may limit the ingress rate for all frames, including read commands and transfer ready messages which solicit data. Additionally or alternatively, if there is way to use the buffer-to-buffer credits or pause frames to selectively limit read commands and transfer ready messages, then limiting the ingress rate may limit the ingress rate for the read commands and/or transfer ready messages. Due to a read command or a transfer ready message ingressing via a particular port 240 (e.g. 246 or 242), data will subsequently egress through the particular port 240. Therefore, due to limiting ingressing read commands and/or transfer ready messages into the particular port 240, either as part of a limitation on all ingressing frames or selectively, the egress rate through the particular port 240 may be lower than if the ingress read commands and/or transfer ready messages were not limited. Consequently, egress congestion at the particular port 240 and/or other network congestion in SAN 200 may be reduced and/or prevented. The egress rate may be lower because limiting the ingressing read commands and/or transfer ready messages into the particular port 240 may mean that less data is being solicited by read commands and/or transfer ready messages that would need to egress from the particular port 240 in a given time interval. It is noted that a read command or transfer ready message may be relatively small (e.g. 70 bytes), but may solicit a large amount of data (e.g. a megabyte of data)

Figure 3:
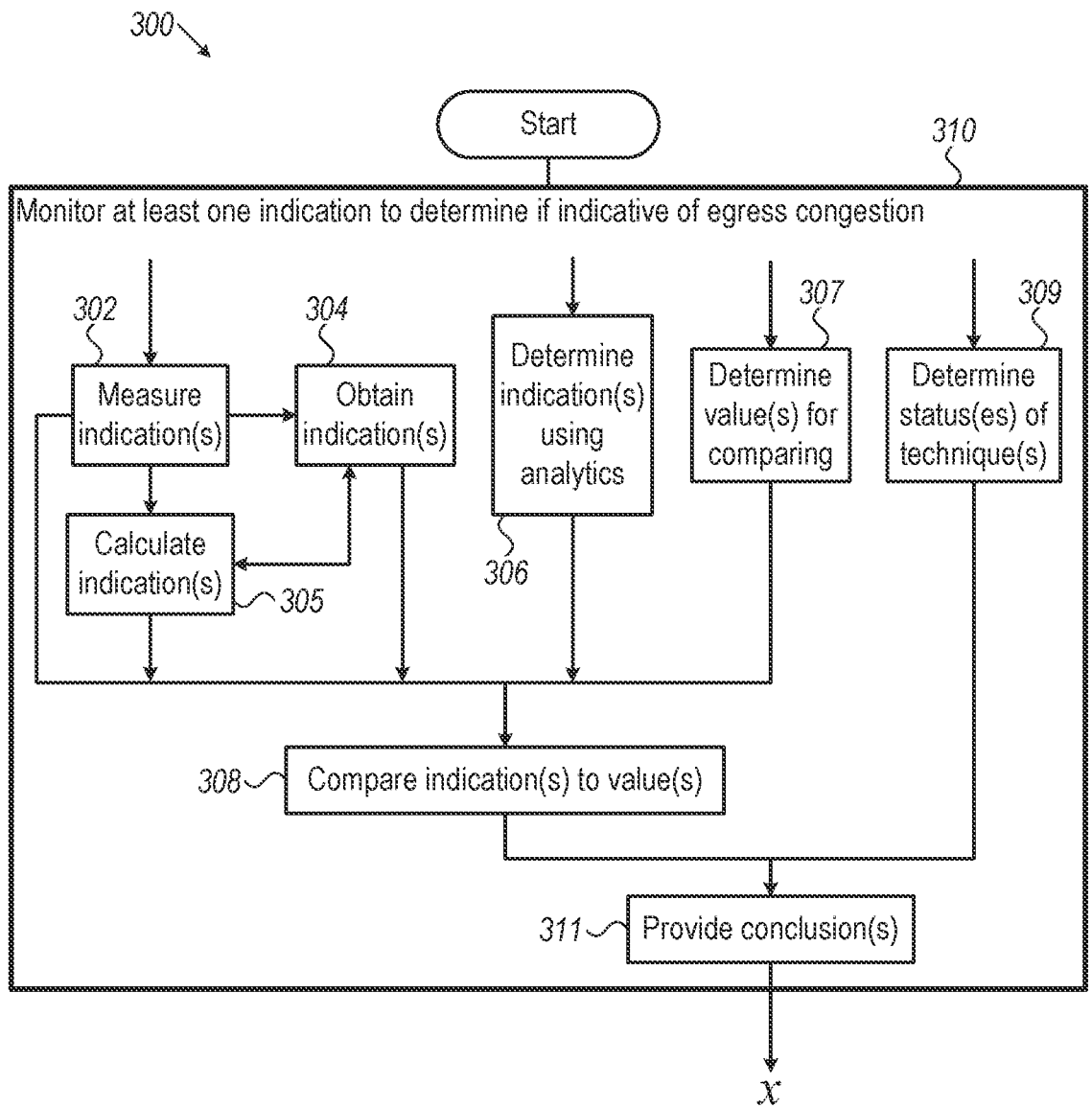
FIG. 3 is a flowchart of a method, in accordance with some embodiments of the presently disclosed subject matter.
Figure 3:
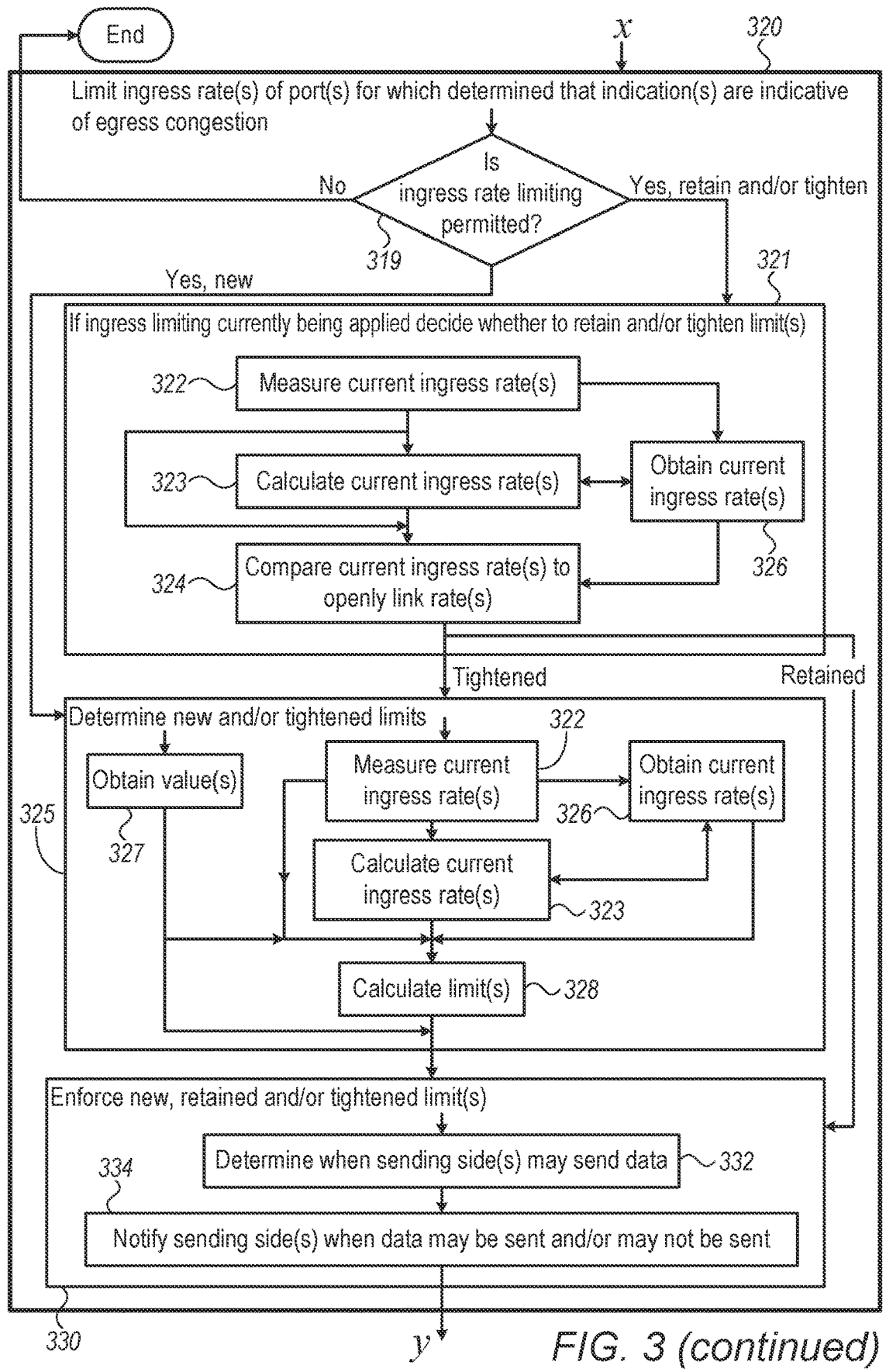
Figure 3:
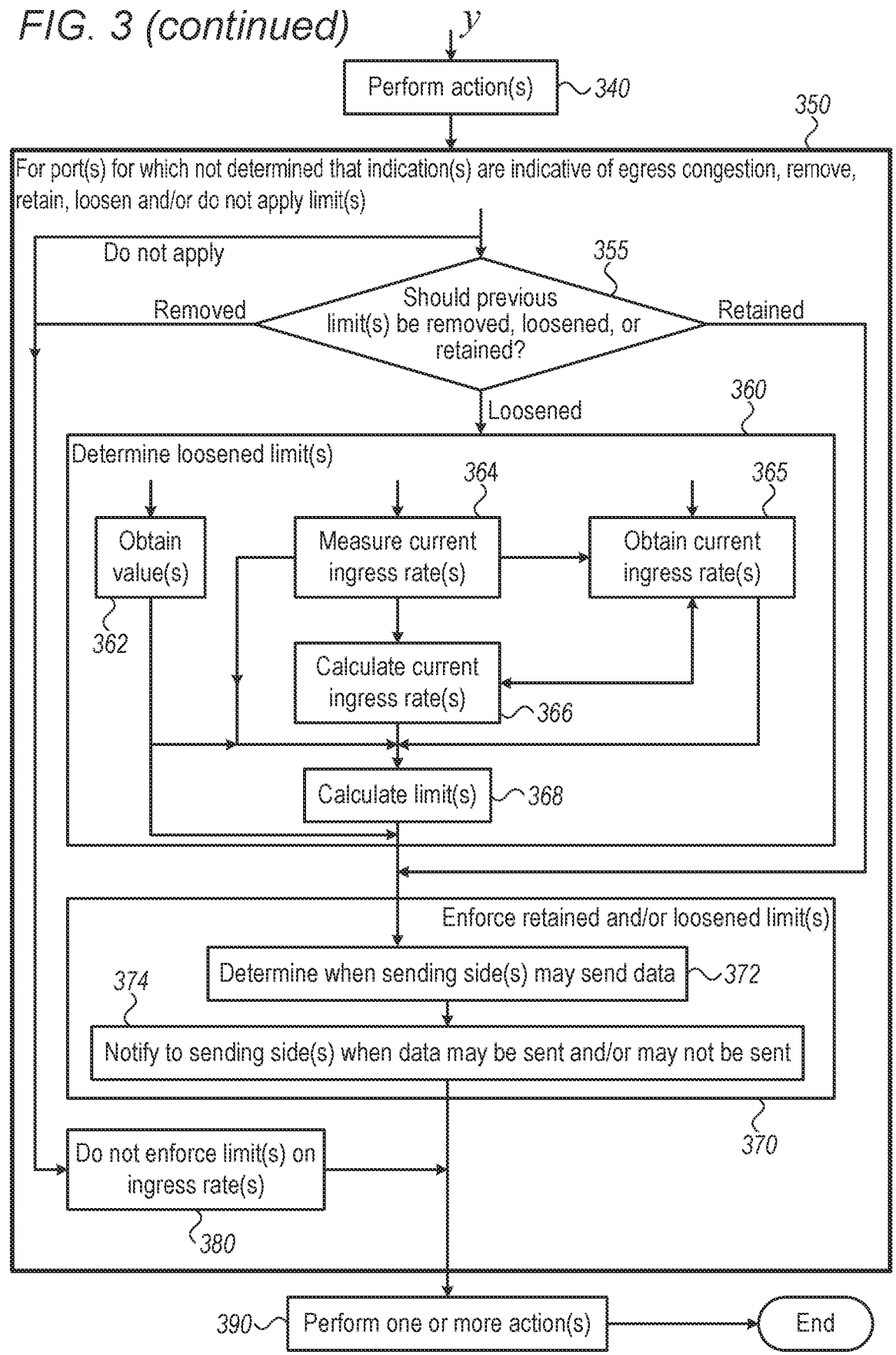

FIG. 3 is a flowchart of a method 300, in accordance with some embodiments of the presently disclosed subject matter.

In stage 310, a particular network device 110 (or more specifically a particular network device 230) monitors at least one indication in order to determine if the at least one indication is indicative of egress congestion. For example, particular network device 110 may monitor indications, in order to determine if the indications are indicative of egress congestion at any of ports 120 (or more specifically 240) of particular network device 110. Alternatively, particular network device 110 may monitor one or more indications in order to determine if the indications are indicative of egress congestion at any of one or more specific ports 120 of particular network device 110, e.g. one or more ports 120 connected to one or more end devices 130, one or more ports 120 adapted for FC and/or FCoE protocols, and/or one or more ports 120 characterized by any other appropriate characteristics, etc.

For example, stage 310 may include a stage 302 of measuring one or more of such indications using one or more counters.

The one or more counters may be implemented in hardware and/or in software. Software when mentioned herein may include firmware, where appropriate. Indications that may be measured by counters may include indications associated with latency, retransmission, and/or extreme delay, e.g. depending on the level of performance degradation to be avoided. For example, indications relating to latency (which may occur for a relatively lower level of performance degradation) may include the amount of time (e.g. in clock cycles) that a given port 120 in particular network device 110 is waiting to transmit, when the given port 120 has data to transmit; and/or the number of times that the given port 120 waits to transmit, when the given port 120 has data to transmit. Additionally, or alternatively, indications relating to latency may include the amount of time and/or number of times that one or more other ports 120 in particular network device 110 cannot receive data and therefore waits, the one or more other ports 120 being adapted to receive data that could feed into the given port 120 (e.g. because the data originates from one or more end devices 130 that are in the same zone as a given end device 130 for which the data is destined). In some examples of counters which may measure such indications relating to latency, the counter may only be incremented when the wait time is above a given threshold (e.g. for every 2.5 microseconds, for every 1 millisecond, for every 100 milliseconds, etc.). Examples of latency indications which may be measured by counters may include:

transmission wait time in increments of, say, 2.5 microseconds during which a given port 120 waits to transmit (e.g. Tx-wait: transmission wait time incrementing every 2.5 microseconds when zero transmit buffer-to-buffer credits remaining for FC protocol; an indication measured by a counter of transmission wait time incrementing every 2.5 microseconds when transmission paused due to a received pause with non-zero quanta for FCoE protocol; etc.);

duration of time in which a given port 120 waits continuously to transmit (e.g. Tx-slowport-oper-delay: duration of time in which zero transmit buffer-to-buffer credits remaining for FC protocol; an indication measured by a counter of duration of time in which transmission paused due to a received pause with non-zero quanta for FCoE protocol; etc.);

number of times a given port 120 waits to transmit (e.g. TxB2Bto0: number of times zero transmit buffer-to-buffer credits remaining for FC protocol; an indication measured by a counter of number of times a pause with non-zero quanta is received for FCoE protocol; etc.);

number of times that a given port 120 waits to transmit for longer than a configurable amount (e.g. Tx-slowport-count: number of times that zero transmit buffer-to-buffer credits remaining for longer than the configurable amount for FC protocol; an indication measured by a counter of number of times that the given port 120 waits to receive a pause with zero quanta after receiving a pause with non-zero quanta for longer than the configurable amount for FCoE protocol; etc.);

transmission wait time in increments of, say, 100 milliseconds, during which a given port 120 waits to transmit (e.g. Tx-credit-not-available and/or Txwtavg100ms: transmission wait time incrementing every 100 milliseconds when zero transmit buffer-to-buffer credits remaining for FC protocol; an indication measured by a counter of transmission wait time incrementing every 100 milliseconds when transmission paused due to a received pause with non-zero quanta for FCoE protocol; etc.); and/or number of times that another port 120 which could feed into a given port 120 waits to receive (e.g. RxB2Bto0: number of times that zero receive buffer-to-buffer credits remaining for FC protocol; an indication measured by a counter of number of times a pause with non-zero quanta is sent for FCoE protocol; etc.); etc.

Indications relating to retransmission (which may occur for a relatively medium level of performance degradation) may include amount of data (e.g. number of frames and/or packets) dropped while waiting to egress via a given port 120. For example, the data may be dropped if not egressing during a default time period (e.g. 500 milliseconds) and/or if not egressing during a defined amount of time. Additionally or alternatively, the data may be dropped if the receiving side prevents data from egressing the given port 120 for a defined period of time (e.g. by withholding buffer-to-buffer credits or by sending pauses with non-zero quanta). Example of retransmission indications which may be measured by counters may include:

Number of frames dropped due to timeout (e.g. Tx timeout discard: number of frames dropped due to system timeout congestion drop and system timeout no credit drop in FC protocol; indication measured by a counter of number of frames dropped due to system timeout congestion drop and system timeout FCoE pause drop for FCoE protocol; etc.). For the FC and FCoE protocols, the amount of time for egressing may be defined, for instance, by configuring system timeout congestion drop and system time out FCoE congestion drop respectively, in order to define the maximum amount of time a frame may remain in particular network device 110 before the frame is dropped. For the FC and FCoE protocols, the amount of time the receiving side may prevent data from egressing may be defined, for instance, by configuring system timeout no-credit drop and system timeout FCoE pause drop, respectively, in order to define a maximum amount of time when the given port 120 is at zero transmit buffer-to-buffer credits or paused, and therefore not transmitting; and/or Number of frames dropped in the transmit direction, including those dropped due to timeout (e.g. Tx discard for FC protocol; an indication measured by a counter of dropped frames for FCoE protocol; etc.); etc.

Indications relating to extreme delay (which may occur for a relatively high level of performance degradation) may include the cumulative number of times that the link for a given port 120 is reset, and/or the cumulative number of times that the given port 120 is waiting to transmit for a long amount of time (such as 1 second or 1.5 seconds), etc. For example, for the FC or FCoE protocol, a receiving side may prevent a given port 120 from sending data by withholding buffer-to-buffer credits or by sending pauses with non-zero quanta. Examples of an extreme delay indication which may be measured by a counter may include:

Number of link resets transmitted by a given port 120 (e.g. Tx-link-reset for the FC protocol; an indication measured by a counter of the number of link resets sent by the given port 120 for the FCoE protocol; etc.), and/or Number of times waiting to transmit for a long time, say 1 second or 1.5 seconds, (e.g. Tx-credit-loss and/or credit-loss-reco: number of times when remaining transmit buffer-to-buffer credits were zero for 1 second or 1.5 seconds for FC protocol; an indication measured by a counter of number of times transmission paused for 1 second or 1.5 seconds due to received pause with non-zero quanta for FCoE protocol; etc.); etc.

Additional or alternative indications that may be measured by counters may include one or more indications relating to actual transmission rate. Examples of a transmission rate indication which may be measured by a counter may include:

Data transmission rate (e.g. Tx-data rate for FC protocol; an indication measured by a counter of data transmission rate for FCoE protocol; etc.), etc.

Additionally or alternatively, stage 310 may include a stage 304 of obtaining one or more indications (e.g. measured and/or calculated). For example, the obtaining may be performed if different parts of stage 310 are performed in different elements of particular network device 110. The obtaining may include, for instance, polling one or more counters that measure one or more indications.

Additionally or alternatively, stage 310 may include a stage 305 of calculating one or more indications for one or more ports 120 of particular network device 110, based on one or more measured indications.

For example, one or more total, average, median, minimum, and/or maximum indication may be calculated based on one or more measured indications. Considering, for instance, an indication relating to latency (e.g. Tx-wait for FC protocol), a total, average, median, minimum, and/or maximum latency indication for a given port 120 may be calculated based on the last measured latency indications (e.g. the last ten measured Tx-wait indications) for the given port 120. Additionally or alternatively, considering, for instance, indications associated with actual transmission rate (e.g. Tx-data rate for FC protocol), a five minute average for the actual transmission rate, and/or or an average actual transmission rate over ten seconds may be calculated. More generally a total, average, median, minimum, or maximum latency, retransmission, extreme delay, or actual transmission rate indication may be calculated based on one or more latency, retransmission, extreme delay, or actual transmission rate measured indications, respectively.

Additionally or alternatively, stage 310 may include a stage 306 of determining one or more indications for one or more ports 120 of particular network device 110, using analytics. For example, one or more indications associated with a solicited transmission rate for a given port 120 may be determined by detecting the amount of data solicited by commands/messages soliciting data (e.g. reads or transfer readys) incoming to the given port 120 and detecting the rate of such incoming commands/messages, and multiplying the amount by the rate.

Additionally or alternatively, stage 310 may include a stage 307 of determining one or more values to which one or more indications are to be compared. Such one or more values may include configurable values, default values, previous indications (e.g. from one or more previous iterations of method 300), the operating link rate, and/or values calculated based on the default/configurable percentages and the operating link rate, etc.

Additionally or alternatively, stage 310 may include a stage 308 of comparing one or more indications to one or more values in order to determine which indications, if any, are indicative of egress congestion.

For example, a measured or calculated indication of the actual transmission rate (e.g. measured transmission rate or average transmission rate over a time period such as 10 seconds) for a given port 120 may be compared in stage 308 to a default or configurable percentage (e.g. 90%) of the operating link rate. The operating link rate may be dependent on the hardware capabilities of the receiving and sending sides; or the operating link rate may be configured or negotiated by both sides of the link to a lower rate than defined by the hardware capabilities. Particular network device 110 may determine an operating link rate based on the configuration/negotiation of the operating link rate, or by detection of the operating link rate. In addition, one or more indications of receiving latency (e.g. RxB2Bto0 for FC protocol) for one or more other ports 120 in particular network device 110 which could feed into the given port 120 may be compared to one or more values of the receiving latency in the previous iteration. If the indication of actual transmission rate is equal to or larger than the default or configurable percentage of the link rate, and the respective receiving latency indication(s) has increased for one or more of the other ports 120, then it may be determined that the indications are indicative of egress congestion for the given port 120. The one or more other ports 120 may be considered as port(s) which could feed into a given port 120, because the one or more other ports 120 and the given port 120 are connected directly and/or indirectly (e.g. via other network device(s) 110) to end devices 130 that are in the same zone and that may therefore communicate with one another. In such an example, there may be an overutilization of a link 160 connected to the given port 120.

As another example of stage 308, an indication of the solicited transmission rate for a given port 120 such as: rate of receiving soliciting commands/messages (e.g. read commands or transfer readys) multiplied by amount solicited may be compared to operating link rate of a link 160 connected to the given port 120. If the indication is equal to or larger than the operating link rate, then it may be determined that the indication is indicative of egress congestion for the given port 120. In such an example, there may be an overutilization of the link 160 connected to the given port 120.

As another example of stage 308, a latency indication such as wait to transmit (Tx-wait) indication for a given port may be compared to a default or configurable time value (e.g. 100 milliseconds). Similarly the count of a counter measuring the wait to transmit (Tx-wait) may be compared to a value in the same units as the count that is representative of a default or configurable time value. If equal to or above the default or configurable time value (or above the representative value), then it may be determined that the latency indication is indicative of egress congestion for the given port 120. In such an example, there may be a low utilization of a link 160 connected to the given port 120.

As another example of stage 308, a retransmission indication and/or an extreme delay indication for a given port 120 may be compared to a default and/or configurable value (e.g. an extreme delay indication may be compared to 1). If equal to or above the value, then it may be determined that the retransmission indication and/or extreme delay indication is indicative of egress congestion at the given port 120. In such an example, there may be a low utilization of a link 160 connected to the given port 120.

If more than one indication for a given port 120 is compared to more than one respective value, then a result of the comparisons (e.g. the result being that the at least one indication is indicative of egress congestion, or that the at least one indication is not indicative of egress congestion) may require that: in all of the comparisons the indications are equal to or larger than respective values, for the at least one indication to be indicative of egress congestion; that in a majority of the comparisons the indications are equal to or larger than the respective values, for the at least one indication to be indicative of egress congestion; that in at least two related comparisons the at least two indications are equal to or larger than at least two respective values, for the at least one indication to be indicative of egress congestion; and/or that in at least one comparison at least one indication is equal to or larger than at least one respective value for the at least one indication to be indicative of egress congestion; etc. Regarding at least two related comparisons, for example, at least one indication of receiving latency for at least one port which could feed into a given port 120, may be equal to or larger than the at least one respective previous value, and the average egress transmission rate for the given port 120 over 10 seconds may be equal to or larger than 90%, for the at least one indication to be indicative of egress congestion at the given port 120.

Although stage 308 was described with reference to indications being equal to or above values, in some embodiments there may additionally or alternatively be one or more indications that are indicative of egress congestion, if below one or more respective values. One or more comparisons adapted for such indications may be applied in such embodiments in stage 308.

Additionally or alternatively, stage 310 may include a stage 309 of monitoring respective at least one indication to determine if the respective at least one indication is indicative of egress congestion for one or more ports, where the respective at least one indication that is monitored in stage 309 may include one or more statuses of one or more of the techniques described above such as data dropping, port shut down (e.g. assertion of port monitor error disable), virtual output queues, congestion isolation, etc. In some embodiments where stage 309 occurs, if one or more of such techniques are performed, then it may be determined, optionally in conjunction with a result of one or more comparisons as described in stage 308, that for one or more ports 120 the respective at least one indication is indicative of egress congestion. If stages 308 and 309 are performed in different elements of particular network device 110, then stage 309 optionally includes a stage of obtaining a result of the comparisons from stage 308.

Additionally or alternatively, stage 310 may include a stage 311 of providing one or more conclusions for one or more ports 120, e.g. based on stages 308 and/or 309. For example, providing a conclusion (i.e. that the at least one indication is indicative of egress congestion, or that the at least one indication is not indicative of egress congestion) for a given port 120 of particular network device 110 may include outputting an output which, if the indication is indicative of egress congestion, causes limitation of the ingress rate. For example, the output may be an instruction to limit the ingress rate, or may be a high or low value which causes the ingress rate to be limited.

In stage 320, the network device limits the ingress rate of one or more ports 120, if any, for which it was determined in stage 310 that the respective at least one indication was indicative of egress congestion. Limiting an ingress rate for a particular port 120 may include beginning to apply a limit when no limit is currently being applied (or in other words applying a new limit), retaining a previously applied limit, or a tightening a previously applied limit.

In some embodiments, stage 320 may include a stage 319 of determining whether or not ingress rate limiting is permitted for one or more one or more ports 120, for which it was determined in stage 310 that the respective at least one indication was indicative of egress congestion. Whether or not such ingress rate limiting is permitted may be preconfigured by an administrator, for example. For any port 120 where ingress rate limiting is not permitted, method 300 may omit the remainder of stage 320. Method 300 may first perform stage 340 (not shown in FIG. 3), or directly end method 300. Additionally, stage 319 may perform determining whether to retain and/or tighten ingress rate limiting and, if ingress rate limiting is to be retained and/or tightened, flow proceeds as described below.

Additionally or alternatively, stage 320 may include a stage 321 of network device 110 deciding for one or more ports 120 where a respective limit on the ingress rate is currently being applied, whether to retain or tighten the respective limit on the rate of ingress. For example, if in the previous iteration, or if in a previous predetermined quantity of iterations of stage 320 the current limit on rate of ingress was retained, then it may be decided in stage 321 to tighten the limit on the rate of ingress (or in other words to further limit the ingress rate). A tightened limit may be a limit that is lower than before. Otherwise, it may be decided in stage 321 to retain the current limit on the rate of ingress.

As another example, a current rate of ingress may be compared to the operating link rate. If the current rate of ingress is below a default or configurable percentage of the operating link rate (e.g. if the current rate of ingress is equal to a minimum ingress rate), it may be decided to retain the limit on the rate of ingress. Otherwise, it may be decided to tighten the limit on the rate of ingress. In such an example, for a particular port 120, stage 321 may include a stage 322 of measuring the current ingress rate and/or a stage 323 of calculating a current ingress rate. Stage 321 may additionally or alternatively include a stage 326 of obtaining the current rate of ingress, as measured or as calculated, and/or a stage 324 of comparing the current rate of ingress to the operating link rate. Stages 322, 323, 324, and 326 will be described in more detail with reference to stage 325.

As another example, there may only be one default or configurable limit on the ingress rate; or there may be one limit on the ingress rate defined by a default or configurable percentage of the operating link rate that may be set in stage 320 on an ingress rate. Therefore, in stage 321, it may be decided to retain the current limit on the rate of ingress.

If it was decided in stage 321 to tighten one or more limits on one or more respective rates of ingress for one or more ports 120, and/or one or more limits are beginning to be applied on respective one or more ingress rate that are not currently being limited, then stage 320 may additionally or alternatively include a stage 325 of particular network device 110 determining one or more tightened and/or new limits for respective one or more ingress rates for such one or more ports 120.

For example, the determination of one or more limits in stage 325 may include a stage 327 of obtaining default and/or configurable values. For example, for a given port 120, there may be one limit, one percentage (e.g. 75%) of the operating link rate, or one percentage (e.g. 75%) of the current ingress rate (e.g. down to a minimum rate of ingress). Alternatively, for example for the given port 120, there may be a series of limits (e.g. down to a minimum rate of ingress) and/or a series of percentages (e.g. 75%, 50%, 25%, 10%, 5%, 1%, 0.5%) of the operating link rate that may be progressively used during various iterations of stage 325.

Additionally or alternatively, the determination of one or more limits in stage 325 may include a stage 322 of measuring the current ingress rates of any ports 120 for which the ingress rates are to be limited. For example, the rate for receiving data at a given port 120 may be indicative of the current ingress rate at the given port 120. A counter such as an Rx data rate counter in the FC protocol or a similar counter in the FCoE or any other protocol may measure the receive data rate.

Additionally or alternatively, the determination of one or more limits of stage 325 may include a stage 323 of calculating total, average, median, minimum, and/or maximum current ingress rates. For example, the five minute average for a current ingress rate for a given port 120 may be calculated.

Additionally or alternatively, the determination of one or more limits of stage 325 may include a stage 326 of obtaining the measured and/or calculated current ingress rates. For example, the obtaining may be performed if different parts of stage 325 are performed in different elements of particular network device 110. Stages 322, 323 and 326 may be omitted if the limits are not based on current ingress rates, or if performed previously as part of stage 321.

Additionally or alternatively, the determination of one or more limits in stage 325 may include a stage 328 of calculating one or more limits based on the current (measured and/or calculated) ingress rates and/or the operating link rates, and based on the obtained percentages of the current ingress rates and/or operating link rates. For example, an ingress rate limit for a given port 120 may be the product of the five minute average current ingress rate and an obtained percentage (e.g. 75%) for the current ingress rate. As another example, if an obtained percentage relates to a percentage for increasing or decreasing the ingress rate, the ingress rate limit for a given port 120 may be the difference between the five minute average current ingress rate and the product of the five minute average current ingress rate and an obtained percentage (e.g. 25%) for the current ingress rate. Stage 328 may be omitted if the limits are not based on current ingress rates or operating link rates.

The limiting in stage 320 may additionally or alternatively include a stage 330 of enforcing the one or more new, retained, and/or tightened limits, if any, on one or more ingress rates. For example, in the FC protocol, in order to enforce a limit on an ingress rate, particular network device 110 may set, retain, or raise a minimum spacing between buffer-to-buffer credits. As another example, in the FCoE protocol, in order to enforce a limit on an ingress rate, particular network device 110 may set, retain, or raise a minimum spacing between a pause with non-zero quanta and a pause with zero quanta. Additionally or alternatively, in the FCoE protocol, in order to enforce a limit on an ingress rate, particular network device 110 may set, retain, or raise a minimum non-zero quanta in a pause. Additionally or alternatively, in the FCoE protocol, in order to enforce a limit on an ingress rate, particular network device 110 may set, retain, or raise a minimum frequency for sending pauses with non-zero quanta. In other protocols, any appropriate flow control mechanism may be implemented.

The enforcing stage 330 of limits may include, for instance, a stage 332 of determining when the sending side(s) may send data (e.g. may send the next packet or frame) to the one or more ports 120 whose respective ingress rates are being limited. A sending side may be allowed to send data to a given port 120 of particular network device 110, at a rate which does not exceed a limit on the ingress rate for the given port 120.

Generally, a sending side may be allowed to send data to a given port 120 of particular network device 110, at a rate constrained both by the state of one or more ingress queueing buffers in network device 110 and by the limit on the ingress rate. For example, for the FC protocol and a leaky bucket algorithm, a register associated with a given port 120 may be reset to a certain value when a buffer-to-buffer credit is sent to the sending side. The register may then be reduced at a rate representative of the limited ingress rate. When the given port 120 receives data (e.g. a packet or frame), if the one or more ingress queueing buffers associated with the given port 120 has not exceeded an internal threshold (or in other words, is not full) or when the associated ingress queueing buffer(s) become not full (or in other words no longer exceed the internal threshold), it may be determined whether or not the register has been reduced to zero. If the register has been reduced to zero, then another buffer-to-buffer credit may be sent to the sending side. If the register has not been reduced to zero, then the other buffer-to-buffer credit may be sent once the register has reduced to zero. As another example, for the FCoE protocol and a leaky bucket algorithm, a register associated with a given port 120 may be reset to a certain value when a pause with non-zero quanta is sent to a sending side due to one or more ingress queueing buffers associated with the given port 120 exceeding an internal threshold (i.e. being full). The register may then be reduced at a rate representative of the limited ingress rate. When the associated one or more ingress queueing buffers is no longer full, it may be determined whether or not the register has been reduced to zero. If so, then a pause with zero quanta may be sent. If not, then the pause with zero quanta may be sent once the register has reduced to zero.

The enforcing stage 330 of limits may additionally or alternatively include a stage 334 of notifying the one or more sending sides for one or more ports 120 when data may be sent and/or when data may not be sent. For example, when in stage 332 it is determined that data may be sent to a given port 120, particular network device 110 may so notify the sending side; and/or when in stage 332 it is determined that data may not be sent to given port 120, particular network device 110 may so notify the sending side. In the FC protocol, for instance, particular network device 110 may notify the sending side that data may not be sent by withholding a buffer-to-buffer credit; and/or particular network device 110 may notify the sending side that data may be sent by sending a buffer-to-buffer credit to the sending side. In the FCoE protocol, for instance, particular network device 110 may notify the sending side that data may not be sent by sending a pause with non-zero quanta; and/or particular network device 110 may notify the sending side that data may be sent by sending a pause with zero quanta.

If the enforcement and the determination of one or more limits are performed in different elements of particular network device 110, then enforcing stage 330 may additionally or alternatively include a stage of providing such one or more limits to the element performing the enforcement.

In some embodiments, the limiting of one or more ingress rates in stage 320 for one or more ports 120, for which it was determined in stage 310 that the respective at least one indication is indicative of egress congestion, may selectively include limiting one or more rates of ingressing of data which leads to data egressing from such one or more ports 120. For example, if the SCSI, FICON and/or NVMe protocol(s) is being implemented, the rate of read commands and/or transfer readys into a given port 120 may be limited, in an attempt to cause the rate of data egressing from the given port 120 to be lower than if the rate of read commands and/or transfer readys were not limited. In such embodiments, limiting an ingress rate in stage 320 may not necessarily include limiting the rate of other ingressing data. In some other embodiments, the limiting of one or more ingress rates in stage 320 for one or more ports 120, for which it was determined in stage 310 that the respective at least one indication is indicative of egress congestion, may include limiting one or more rates of ingressing of data regardless of whether the ingressing data leads to data egressing from such one or more ports 120. Such limiting may inherently include limiting one or more rates of certain ingressing data (e.g. read commands and/or transfer readys if the SCSI, FICON and/or NVMe protocol(s) is being implemented) which leads to data egressing from such one or more ports 120. Therefore one or more rates of data egressing from such one or more ports 120 may be expected to be lower than if the ingress rate(s) were not limited.

In some embodiments, the ingress rate limiting may be extended to one or more other ports 120. For example, if certain ports 120 are grouped in a port channel, then in such embodiments, once ingress rate limiting is applied to one of the ports 120 in the port channel, ingress rate limiting may also be applied to other ports 120 in the port channel.

Optionally in stage 340, particular network device 110 performs one or more action(s) when stage 320 is performed. For example, alert(s) may be issued (e.g. one or more SNMP traps and/or system messages may be generated). In some embodiments, an alert may be issued if an ingress rate for a port has been limited to a minimum ingress rate (e.g. to a minimum percentage of the operating link rate such as $\frac{1}{20}^{th}$ of a percent of the operating link rate). In some other embodiments, an alert may be issued whenever stage 320 is performed. Method 300 ends after stage 320 or 340 for the one or more ports 120, of particular network device 110, for which it was determined in stage 310 that the respective at least one indication is indicative of egress congestion.

In stage 350, for one or more ports 120 of particular network device 110, if any, for which it was not determined in stage 310 that the respective at least one indication is indicative of egress congestion, particular network device 110 may remove, retain, and/or loosen one or more respective limits on respective one or more rates of ingress, if any were previously applied. For one or more ports 120 for which it was not determined in stage 310 that the respective at least one indication is indicative of egress congestion, and where no limit on ingress rate was previously applied, the non-application of a limit may remain unchanged (or in other words application of a limit is not begun). Removing or not applying a limit for a given port 120 may allow the sending side to send data to the particular port 120 of particular network device 110, at a rate constrained by the state of the ingress buffers in network device 110. Loosening or retaining for the given port 120, on the other hand, may allow the sending side to send data to the particular port 120 of particular network device 110, at a rate constrained both by the state of the ingress queueing buffers in particular network device 110 and by the loosened or retained limit on the ingress rate.

In some embodiments, stage 350 may include a stage 355 of particular network device 110 deciding for one or more ports 120 where a respective limit on the ingress rate was previously applied; and it was not determined in stage 310 that the respective at least one indication is indicative of egress congestion, whether to remove, loosen, or retain the respective limit to the rate of ingress.

For example, if in a previous iteration, or if in a previous predetermined quantity of iterations of stage 350 the limit on rate of ingress was retained, then it may be determined in stage 355 to loosen the limit on the rate of ingress. Otherwise, it may be decided to retain the limit on the rate of ingress.

As another example, if in a previous iteration, or if in a previous predetermined quantity of iterations of stage 350 the limit on rate of ingress was loosened, then it may be decided in stage 355 to remove the limit on the rate of ingress. Otherwise, it may be decided to loosen the limit on the rate of ingress.

As another example, a current rate of ingress may be compared to the operating link rate. If the current rate of ingress is equal to or greater than a default or configurable percentage of the operating link rate, it may be decided in stage 355 to retain the limit on the rate of ingress. Otherwise, it may be decided to loosen the limit on the rate of ingress. In such an example, for a given port 120, stage 355 may include a stage of measuring the current ingress rate (similar to the description of stage 364 below), a stage of obtaining the current ingress rate (similar to the description of stage 365 below) and/or a stage of calculating a current ingress rate (similar to the description of stage 366 below). Stage 355 may additionally or alternatively include a stage of comparing the current rate of ingress, as measured, or calculated, to the operating link rate.

As another example, there may only be one default or configurable limit on the ingress rate, or there may be one limit on the ingress rate defined by a default or configurable percentage of the operating link rate that may be set in stage 320 on an ingress rate. Therefore, if such a limit was previously applied, in stage 355 it may be decided to remove such a limit.

If decided in stage 355 to loosen one or more limits on one or more respective rates of ingress for one or more ports 120, then stage 350 may additionally or alternatively include a stage 360 of particular network device 110 determining the one or more loosened limits. A loosened limit may be a limit that is higher than before.

For example, the determination of one or more loosened limits in stage 360 may include a stage 362 of obtaining one or more default and/or configurable values. For example, for a given port 120, there may be one percentage (e.g. 110%) of the current ingress rate (e.g. up to a maximum rate of ingress, for instance in relation to the operating link rate). Alternatively, for example for the given port 120, there may be a series of limits (e.g. up to a maximum rate of ingress) and/or a series of percentages (e.g. 0.5%, 1%, 5%, 10%, 25%, 50%, 75%) of the operating link rate that may be progressively used during various iterations of stage 360.

Additionally or alternatively, the determination of one or more loosened limits in stage 360 may include a stage 364 of measuring the respective one or more current ingress rates of any one or more ports 120 for which respective one or more limits on respective one or more ingress rates are to be loosened. For example, the rate for receiving data at a given port 120 may be indicative of the current ingress rate at the given port 120. A counter (e.g. Rx data rate in FC protocol, a similar counter in FCoE or any other appropriate protocol, etc.) may measure the receive data rate. Stage 364 may be omitted, if stage 352 is performed, or if the one or more loosened limits are not based on one or more respective current ingress rates.

Additionally or alternatively, the determination of one or more loosened limits of stage 360 may include a stage 365 of obtaining the measured and/or calculated current ingress rates. For example, the obtaining may be performed if different parts of stage 360 are performed in different elements of the particular network device 110.

Additionally or alternatively, the determination of one or more loosened limits of stage 360 may include a stage 366 of calculating one or more total, average, median, minimum, and/or maximum current ingress rates. For example, the five minute average for a current ingress rate for a given port 120 may be calculated. Any of stages 364, 365 and 366 may be omitted if previously performed during stage 355, or if the one or more loosened limits is not based on respective one or more current ingress rates.

Additionally or alternatively, the determination of one or more loosened limits in stage 360 may include a stage 368 of calculating one or more loosened limits based on the current respective (measured and/or calculated) one or more ingress rates and/or the operating link rates, and based on the respective one or more obtained percentages of the respective one or more current ingress rates and/or operating link rates. For example, a loosened ingress rate limit for a given port 120 may be the product of the five minute average current ingress rate and an obtained percentage (e.g. 110%) for the current ingress rate. Stage 368 may be omitted if the one or more loosened limits are not dependent on one or more respective current ingress rates and/or link rates.

If stage 360 and stage 370 (to be described below) are performed in different elements of particular network device 110, then stage 360 may additionally or alternatively include a stage of providing one or more limits to the element performing the enforcement.

If it is decided in stage 355 to retain and/or loosen one or more limits on respective one or more rates of ingress, then stage 350 may additionally or alternatively include a stage 370 of enforcing the one or more retained and/or loosened limits on the ingress rates. For example, in the FC protocol, in order to enforce a retained or loosened limit on an ingress rate for a given port 120, particular network device 110 may retain or lower a minimum spacing between buffer-to-buffer credits. As another example, in the FCoE protocol, in order to enforce a loosened limit on an ingress rate for a given port 120, particular network device 110 may retain or lower a minimum spacing between a pause with non-zero quanta and a pause with zero quanta. Additionally or alternatively, in the FCoE protocol, in order to enforce a loosened limit on an ingress rate for a given port 120, particular network device 110 may retain or lower a minimum non-zero quanta in a pause. Additionally or alternatively, in the FCoE protocol, in order to enforce a loosened limit on an ingress rate for a given port 120, particular network device 110 may retain or lower a minimum frequency for sending pauses with non-zero quanta. In other protocols, any appropriate flow control mechanism may be retained or loosened.

The enforcing of retained and/or loosened limits in stage 370 may include, for instance, a stage 372 of determining when the sending sides may send data (e.g. may send the next packet or frame) to the ports 120, if any, whose limits on ingress rates are being retained or loosened. A sending side may be allowed to send data to a given port 120 of particular network device 110, at a rate which does not exceed the retained or loosened limit on the ingress rate for the given port 120.

Generally, the sending side may be allowed to send data to a given port 120 of particular network device 110, at a rate constrained both by the state of one or more ingress queueing buffers in particular network device 110 and by the retained or loosened limit on the ingress rate. For example, for the FC protocol for a given port 120 and a leaky bucket algorithm, a register may be reset to a given value when a buffer-to-buffer credit is sent to a sending side. The register may then be reduced at a rate representative of the retained or loosened limited ingress rate determined in stage 360. When the given port 120 receives data (e.g. a packet or frame), if the one or more ingress queueing buffers associated with the given port has not exceeded an internal threshold (or in other words is not full) or when the ingress buffer becomes not full (or in other words no longer exceeds an internal threshold), it is determined whether or not the register has been reduced to zero. If so, then another buffer-to-buffer credit may be sent to the sending side. If not, then the other buffer-to-buffer credit may be sent once the register has reduced to zero. As another example, for the FCoE protocol for a given port 120 and a leaky bucket algorithm, a register may be reset to a given value when a pause with non-zero quanta is sent to a sending side due to one or more ingress queueing buffers associated with the given port 120 exceeding an internal threshold (i.e. being full). The register may then be reduced at a rate representative of the retained or loosened limited ingress rate. When the associated one or more ingress queueing buffers is no longer full, it is determined whether or not the register has been reduced to zero. If so, then a pause with zero quanta may be sent. If not, then the pause with zero quanta may be sent once the register has reduced to zero.

The enforcing stage 370 of one or more retained and/or loosened limits may additionally or alternatively include a stage 374 of notifying the one or more sending sides when data may be sent and/or when data may not be sent. For example, when in stage 372 it is determined that data may be sent to a given port 120, particular network device 110 may so notify the sending side; and/or when in stage 372 it is determined that data may not be sent to given port 120, particular network device 110 may so notify the sending side. In the FC protocol, for instance, particular network device 110 may notify the sending side that data may not be sent by withholding a buffer-to-buffer credit; and/or particular network device 110 may notify the sending side that data may be sent by sending a buffer-to-buffer credit to the sending side. In the FCoE protocol, for instance, particular network device 110 may notify the sending side that data may not be sent by sending a pause with non-zero quanta; and/or particular network device 110 may notify the sending side that data may be sent by sending a pause with zero quanta.

In some embodiments, stage 360 (determining one or more limits) and/or 370 (enforcing one or more limits) may selectively include determining and/or enforcing with respect to data ingressing to one or more ports 120, which leads to data egressing from such one or more ports 120. For example, if the SCSI, FICON and/or NVMe protocol(s) is being implemented, a retained or loosened limit may be applied to a rate of read commands and/or transfer readys into a given port 120, in an attempt to cause the egress rate out of the given port 120 to be lower than if the limit were removed. More specifically, enforcing a loosened or retained limit in stage 370 to a given port 120 rather than removing a limit may allow the egress rate for the given port 120 to rise from a previous egress rate but prevent the egress rate from rising, what may be considered as, too much and/or too quickly. In such embodiments, stage 360 and/or 370 may not necessarily include determining and/or enforcing with respect to other ingressing data. In other embodiments, stage 360 and/or 370 may include determining and/or enforcing with respect to data ingressing to one or more ports 120, regardless of whether the ingressing data leads to data egressing from such one or more ports 120. Such determining and/or enforcing may inherently include determining and/or enforcing with respect to certain ingressing data (e.g. read commands and/or transfer readys if the SCSI, FICON, and/or NVMe protocol(s) is being implemented) which leads to data egressing from such one or more ports 120. Therefore, such certain ingressing data may be expected to continue to be limited, and therefore one or more rates of data egressing from such one or more ports 120 may be expected to be lower than if limit(s) on the ingress rate(s) were removed (e.g. the egress rate(s) may be preventing from rising, what may be considered as, too much and/or too quickly).

If it is decided in stage 355 to remove one or more limits on rates of ingress, or if stage 350 includes not applying one or more limits on rates of ingress, for one or more given ports 120, then stage 350 may additionally or alternatively include a stage 380 of not enforcing limits on rates of ingress for the given one or more ports 120. For example, in the FC protocol for a given port 120, if a limit on the ingress rate is not being enforced, there may not necessarily be a minimum spacing employed between buffer-to-buffer credits. As another example, in the FCoE protocol, if a limit on the ingress rate is not being enforced, there may not necessarily be a minimum spacing employed between a pause with non-zero quanta and a pause with zero quanta; there may not necessarily be a minimum non-zero quanta applied in a pause; and/or there may not necessarily be a minimum frequency employed for sending pauses with non-zero quanta. In other protocols, any appropriate flow control mechanism may not necessarily be employed. Removing and/or not applying an ingress rate limit for a given port 120 may lead to an egress rate from the given port 120 that is higher than if there were an ingress rate limit for the given port 120.

If a limit on the ingress rate is not being enforced for a given port 120 (e.g. because the limit was removed or not applied), then generally, the sending side may be allowed to send data to the given port 120 of particular network device 110, at a rate constrained by the state of one or more ingress queueing buffers in particular network device 110. For example, for the FC protocol, when the given port 120 receives data (e.g. a packet or frame) from a sending side, if the one or more ingress queueing buffers associated with the given port 120 is not full (i.e. has not exceeded an internal threshold) or when the one or more associated ingress queueing buffers become not full (e.g. no longer exceeds an internal threshold), particular network device 110 may send a buffer-to-buffer credit to the sending side. As another example, for the FCoE protocol, particular network device 110 may send a pause with non-zero quanta to a sending side due to one or more ingress queueing buffers associated with a given port 120 being full. When the associated ingress buffer(s) is no longer full, particular network device 110 may send a pause with zero quanta to the sending side.

Optionally in stage 390, particular network device 110 performs one or more action(s) when stage 350 is performed. For example, alert(s) may be issued (e.g. one or more SNMP traps and/or system messages may be generated).

In some embodiments, method 300 may include more, fewer, and/or different stages than illustrated in FIG. 3. For instance, instead of the examples of monitoring (e.g., including examples of indications and/or comparisons, etc.), and/or the examples of ingress rate limiting described above, other monitoring and/or limiting may be performed. Such other monitoring may include, for example, monitoring one or more indications dependent on the occupancy of egress queueing buffers, if such buffers are implemented in memory circuitry 102 of particular network device 110. Additionally or alternatively, certain of the stages described above for method 300 may be omitted such as any of the stages included in stage 310, 320 and/or 350; and/or such as any of stages 340, 350 and/or 390.

In some embodiments, certain other techniques (e.g. dropping data, shutting down ports, using per destination virtual output queues, congestion isolation, etc.) may be configured to be performed in addition to or instead of stage 320 or stage 350. For example, one or more of such techniques may be performed if despite ingress rate limiting over a given number of iterations for one or more ports 120, respective at least one indication for the one or more ports 120 is indicative of egress congestion at the one or more ports 120. As another example, one or more of such techniques may be performed if the ingress rate(s) for one or more ports 120 have been limited to respective one or more minimum ingress rate(s), but respective at least one indication for the one or more ports 120 is still indicative of egress congestion at the one or more ports 120.

Method 300 may be repeated by particular network device 110, e.g. episodically, periodically and/or upon any appropriate event. For example, method 300 may be performed every 1 second, every 5 seconds, every 10 seconds, every 30 seconds, every 60 seconds, etc. Periodicity may be dependent on one or more factors, such as administrator preference. An example of an appropriate event may include a credit loss recovery event (e.g. transmit buffer-to-buffer credits at zero for one full second) which includes a Link Reset where the buffer-to-buffer credits (e.g. transmit and receive) are re-initialized for a link. Not necessarily the same at least one indication is monitored for a given port 120 of particular network device 110 during each iteration of method 300 if method 300 is repeated for the given port 120. In some embodiments, method 300 may not necessarily be repeated for a given port 120, after a limit on the ingress rate is applied, meaning that the applied limit may remain as is, until removed, e.g. by an administrator.

As mentioned above, depending on the embodiments, method 300 may not necessarily be performed for all of the ports 120 of particular network device 110. Moreover, method 300 may not necessarily be performed by particular network device 110 at the same time for all port(s) 120 of the particular network device 120 whose respective at least one indication is being monitored. Although method 300 was described as if each of the stages is performed in parallel for all ports 120 of particular network device 110 whose respective at least one indication is being monitored, in some embodiments, any stage may instead be performed separately for a subset (e.g. one or more) of such ports 120. Additionally or alternatively, stages that are shown in FIG. 3 as being performed sequentially may be performed in parallel; and/or stages that are shown in FIG. 3 as being performed in parallel may be performed sequentially. For example, stage 320 or 350 for a group of ports 120 of particular network device 110 may be performed in parallel with stage 310 for a different group of ports 120 of particular network device 110. Additionally or alternatively, the order of stages may differ from the order illustrated in FIG. 3.

In some embodiments, method 300 may be performed by all network devices 110 in network 100 (e.g. all network devices 230 in SAN 200), whereas in other embodiments method 300 may be performed by only a subset of network devices 110 in network 100. In the latter embodiments, for example, method 300 may be performed by any network device 110 applying the FC and/or FCoE protocols, and/by any network device 110 connected to at least one end device, etc.

Figure 4:
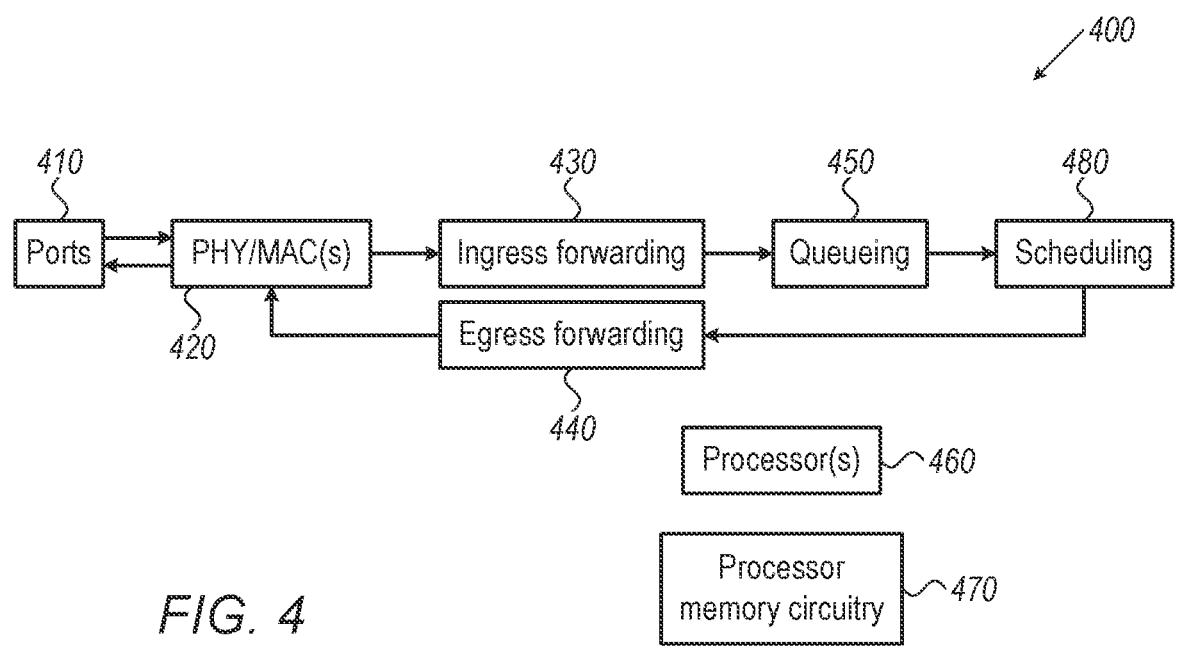
FIG. 4 is a block diagram of a network device, in accordance with some embodiments of the presently disclosed subject matter.

FIG. 4 is a block diagram of a network device 400, in accordance with some embodiments of the presently disclosed subject matter. Network device 400 is an example of a particular network device 110 of FIG. 1A (e.g. more specifically, an example of a particular network device 230 of FIG. 2). Therefore processing circuitry, memory circuitry, monitoring circuitry, and limiting circuitry referred to in the description of FIG. 4 are respective examples of processing circuitry 104, memory circuitry 102, monitoring circuitry 106 and limiting circuitry 108 discussed above with reference to FIG. 1A.

Network device 400 includes a plurality of ports 410. For example, if network device 400 implements the FC and/or FCoE protocol, ports 410 may include one or more FC protocol ports and/or one or more FCoE protocol ports, such as one or more F ports, one or more E ports, and/or one or more NP ports, etc.

Network device 400 further includes one or more physical layers (PHYs)/media access controllers (MACs) 420 (e.g. specific to the FC protocol, the FCoE protocol, and/or any other protocol(s) implemented by network device 400). For example, PHY(s)/MAC(s) 420 may comprise one or more application specific integrated circuits (ASICs) with processing circuitry and/or memory circuitry. If there are one or more links linking network device 400 in a network (e.g. in network 100 of FIG. 1A or more specifically in a SAN such as SAN 200) which are optical fiber, PHY(s)/MAC(s) 420 may convert optical signals to electrical signals and vice versa.

The memory circuitry and/or processing circuitry in the one or more PHYs/MACs 420 may include monitoring circuitry such as one or more hardware counters for measuring one more indications for one or more of ports 410. Examples of such indication(s) were described above. Monitoring circuitry in the one or more PHYs/MACs 420 may additionally or alternatively include one or more adders, multipliers, multiplexers shift registers, flip flops, latches, combinational logic gates (e.g. OR gate(s), AND gate(s), XOR gate(s), NOT gate(s), NOR gate(s), NAND gate(s), XNOR gate(s), etc.), comparators, state machines, and/or other combinational and/or sequential logic, etc., for calculating one or more indications, determining one or more suitable values, comparing one or more measured and/or calculated indications to one or more suitable values in order to determine if respective at least one indication is indicative of egress congestion, and/or providing conclusions, etc. For example, a conclusion may be an output of a comparator, or may be a combined output (e.g. using one or more logic gates) which is dependent on the result of the one or more comparisons.

The memory circuitry and/or processing circuitry in PHY(s)/MAC(s) 420 may additionally or alternatively comprise limiting circuitry, such as one or more registers. A register may be associated with a given port 410 and may have a value of the register decreasing at a certain modifiable rate, e.g. in accordance with a leaky bucket algorithm. The rate may be set when ingress limiting is applied. The set rate may subsequently be retained if ingress limiting is being retained, and/or may subsequently be modified upon ingress limiting being loosened, and/or tightened. For example, for the FC or one procedure in the FCoE protocol, the register associated with the given port 410 may begin to "leak" (or in other words the value of the register may begin to be reduced) when a MAC (included in PHY(s)/MAC(s) 420) sends a buffer-to-buffer credit or a pause with non-zero quanta via the particular port 410. The MAC may send another buffer-to-buffer credit or a pause with zero quanta via the given port 410 when the register drains out (or in other words the value of the register reduces to zero), data has been received via the particular port 410, and one or more ingress queueing buffers associated with the given port 120 do not exceed an internal threshold. Limiting circuitry comprised in such PHY(s)/MAC(s) 420 may additionally or alternatively include one or more counters for measuring receive data rates for one or more of ports 410, and/or one or more adders, multipliers, shift registers, flip flops, latches, combinational logic gates, comparators, state machines, and/or other combinational and/or sequential logic, etc. for obtaining values, performing calculations, and/or performing comparisons, etc. For example, one or more multipliers may be used to multiply one or more percentages (e.g. configurable percentage(s)) by one or more measured and/or calculated ingress rates in order to determine one or more limits for the one or more ingress rates.

Any of the described monitoring circuitry and/or limiting circuitry may be omitted from PHY(s)/MAC(s) 420 if the functionality is implemented elsewhere in network device 400 (e.g. by one or more processors 460 executing software), and/or if the functionality is optional and not implemented in network device 460. Additionally or alternatively, the monitoring circuitry and/or limiting circuitry in PHY(s)/MAC(s) 420 may include other circuitry for implementing monitoring functionality, limiting functionality, and/or other functionality in addition to or instead of any of the examples of monitoring circuitry and limiting circuitry described above. Additionally or alternatively, monitoring circuitry and limiting circuitry in PHY(s)/MAC(s) 420 may share certain circuitry.

Network device 400 further includes logic for an ingress forwarding 430, an egress forwarding 440, a scheduling 480, and a queueing 450. Ingress forwarding 430 and egress forwarding 440 may be adapted to perform forwarding operations such as such as bridging and/or routing, etc., as is known in the art. Scheduling 480 may be adapted to perform scheduling operations as is known in the art.

Queueing 450 may include memory circuitry implementing one or more ingress queueing buffers. For example, as mentioned above, if network device 400 implements the FC protocol and/or the FCoE protocol in accordance with one type of procedure, and ingress rate limiting is being applied, a MAC (included in PHY(s)/MAC(s) 420) may send a buffer-to-buffer credit or a pause with zero quanta via a given port 410 when the register associated with a given port 410 "drains out", provided one or more ingress queueing buffers associated with the given port 410 and implemented by queueing 450 have not exceeded an internal threshold and data has been received via the given port 410; or may subsequently send the buffer-to-buffer credit or the pause with zero quanta when the one or more associated ingress queueing buffers implemented by queueing 450 no longer exceed the internal threshold. In some embodiments, the memory circuitry in queueing 450 may additionally or alternatively implement one or more egress queueing buffers for queueing data that is to be sent out of network device 400.

Network device 400 further includes one or more processors 460 as an example of processing circuitry (e.g. which comprises monitoring circuitry and/or limiting circuitry). Any processor 460 may be of any suitable type operative to execute instructions (also referred to herein as software or computer readable program code), such as a load store processor, a processing pipe, a programmable very long instruction word (VLIW) engine, etc. Processor(s) 460 may include, for example, any of the following: graphics processing unit(s) (GPU(s)), digital signal processor(s) (DSP(s)) central processing units (CPU(s)), etc. Such processor(s) 460 may execute software, such as software stored in memory circuitry 470 that is associated with processor(s) 460, in order to perform monitoring and/or limiting operations and optionally other operations. In an example where the software (also referred to herein as computer readable program code) and/or other data used by the one or more processors 460 is stored in memory circuitry 470, the one or more processors 460 and memory circuitry 470 may comprise monitoring circuitry and/or the limiting circuitry. Monitoring operation(s) may include determining indications by: measuring indications using software counters as described above, by performing analytics as described above, by determining statuses of certain techniques discussed above, by obtaining indications measured and/or calculated by PHY/MAC(s) 420, and/or by calculating indications based on indications measured by PHY/MAC(s) 420, etc. Monitoring operation(s) may additionally or alternatively include determining whether or not the indications are indicative of egress congestion, by comparing measured and/or calculated indications to values such as configurable values, by obtaining a result of comparisons performed by PHY/MAC(s) 420, and/or by determining if the statuses of the techniques include that one or more of the techniques were performed, etc. Monitoring operations may additionally or alternatively include providing conclusions regarding egress congestion. Such monitoring operations as described in this paragraph may be associated with instructions in port monitoring software.

Limiting operation(s) with respect to one or more ingress rates may be performed when applying, retaining, tightening, and/or loosening one or more limits for one or more ingress rates. Limiting operation(s) may include determining limit(s) on ingress rate(s), and/or determining whether or not to limit the ingress rate(s) for port(s), upon determining that the respective at least one indication is indicative of egress congestion. For example, determining a limit on an ingress rate for a given port 410 may include obtaining the limit from one of a plurality of specified limits, where the highest limit may be obtained initially, and then lower or higher limits may be progressively obtained for tightening or loosening the limit in subsequent iterations. Additionally or alternatively, determining the limit on the ingress rate for a given port 410 may include obtaining the current ingress rate and a percentage (e.g. configurable percentage) and calculating the limit based on the current ingress rate and the percentage. Additionally or alternatively, limiting operation(s) may include providing the determined limit(s) to PHY/MAC(s) 420, e.g. so that the limit(s) may be enforced. Such limiting operation(s) may be associated with instructions in port management software. For example, port management software or a line card manager software may include instructions to perform ingress rate limiting with respect to a given port 410 or to perform other technique(s) (e.g. drop data, shut down port, etc.), if the at least one indication is indicative of egress congestion at the given port 410.

Port monitoring software, line card manager software, and/or port management software may be included, for example, in NX-OS software, e.g. if network device 400 is a Cisco® MDS switch. Optionally, the software may be partly configurable (e.g. by an administrator upon installation/updating of the software) in order to be applicable in different implementations. For example, indication(s) to be monitored may be configurable, value(s) for modifying ingress rate(s) (e.g. limit(s) and/percentage(s), etc.) may be configurable, technique(s) to be performed may be configurable, minimum ingress rate(s) below which the ingress rate(s) may not be limited may be configurable, value(s) to which the indication(s) are to be compared may be configurable and/or operating link rate(s) may be configurable, etc. The possibility of connection of an administrator computer to a network device 400 was discussed above. The software may differ depending on the implementation, for example, including more, fewer and/or different instructions, depending on the division of functionality in network device 400, e.g. between PHY/MACs 410 and processor(s) 460/memory circuitry 470.

The arrows in FIG. 4 show a possible path of a frame or packet inside network device 400. The frame or packet may enter network device 400 via a first port 410, proceed to PHY/MAC(s) 420, then to ingress forwarding 430, queueing 450, scheduling 480, egress forwarding 440, PHY/MAC 420, and out network device 400 via a second port 410.

Network device 400 may or may not include a plurality of line cards. In an example where network device includes a plurality of line cards, the various parts of elements 410, 420, 430, 440, 450, 460, 470, and/or 480 may be associated with the individual line cards and/or with the chassis (or more specifically with the supervisor card of the network device). If network device 400 implements the FC protocol and/or the FCoE protocol, network device 400 may be, for instance, a SAN basic switch or a SAN director switch, the switch operating in switch mode or in NPV mode.

In some embodiments, network device 400 may comprise fewer, more and/or different elements than elements 410, 420, 430, 440, 450, 460, 470, and 480 illustrated in FIG. 4. Additionally or alternatively, network device 400 may have additional, less, and/or different functionality than described herein. Additionally or alternatively, elements in network device 400 may have a different arrangement than described herein.

In some embodiments, in addition to or instead of any of the examples listed above, processing circuitry anywhere in network device 400 may include resistor(s), inductor(s), capacitor(s), diode(s), transistor(s), other switching component(s), etc. (that are not part of the examples listed above); other integrated circuit(s) such as field programmable gate array(s) (FPGA(s)), full-custom integrated circuit(s), etc. In addition to or instead of any of the examples listed above, memory circuitry anywhere in network device 400 may include cache(s), random access memory (RAM), read-only memory (ROM), static random access memory (SRAM), dynamic random access memory (DRAM), embedded DRAM, Double-Data-Rate DRAM (DDR-DRAM), SDRAM, programmable ROM (PROM), erasable programmable ROM (EPROM), electrically erasable programmable ROM (EEPROM), flash memory (e.g., NOR or NAND flash memory), solid state drive(s), content addressable memory (CAM), polymer memory, phase-change memory, ferroelectric memory, silicon-oxide-nitride-oxide-silicon (SONOS) memory, etc.

Some embodiments of the present disclosure may include one or more of the following advantages. First, communication between network devices (e.g. inter-switch communication) may not be necessary. Both the monitoring and the limiting may be performed by the same network device. Second, a limitation on an ingress rate may not necessarily be permanent, but may be removed or gradually loosened. Third, embodiments may be implemented using various protocols, such as the FC protocol and the FCoE protocol. Fourth, embodiments may be implemented for a network (e.g. a SAN) that includes one network device, or a network that includes a plurality of network devices. Fifth, by limiting the ingress rate from a slow to accept or greedy end device, the impact of the greediness or slowness may be restricted to the end device, and congestion elsewhere in the network may be reduced or prevented. Sixth, as opposed to other techniques, no data need be dropped and therefore errors will not occur due to data loss. Additionally or alternatively, as opposed to congestion isolation, related end devices such as end devices that are in the same zone as a greedy or slow to accept end device are not affected. Other advantages may be apparent from the description herein.

It will be appreciated that the subject matter contemplates, for example, a computer program product comprising a computer readable medium having computer readable program code embodied therein for causing a network device to execute one or more methods and/or one or more parts of method(s) disclosed herein, such as method 300 (FIG. 3). Further contemplated, for example, are computer readable program code for causing a network device to execute method(s) and/or part(s) of method(s) disclosed herein; and/or a computer readable medium having computer readable program code embodied therein for causing a network device to execute method(s) and/or part(s) of method(s) disclosed herein. A computer readable medium, for example, may include any suitable medium for transferring computer readable program code, e.g. if software is transferred to the network device in electronic form, over a network. Alternatively or additionally, a computer readable medium may include any suitable computer readable storage medium for storing computer readable program code, such as described above, and/or such as any other appropriate computer readable storage medium.

In summary, in one aspect, a method is provided comprising: egressing data from a port of the network device at an egress rate over a link connected to the port; ingressing data into the port at an ingress rate over the link; monitoring at least one indication with respect to the egressing data in order to determine whether the at least one indication is indicative of egress congestion at the port of the network device; and upon determining that the at least one indication is indicative of the egress congestion at the port, limiting the rate of ingress via the port.

In another aspect, an network device is provided comprising: a plurality of ports including a port configured to egress data from the port at an egress rate over a link connected to the port, and configured to ingress data into the port at an ingress rate over the link; circuitry, including memory circuitry and processing circuitry coupled to each other and to the plurality of ports, the circuitry configured to: monitor at least one indication with respect to the egressing data in order to determine whether the at least one indication is indicative of egress congestion at the port; and upon determining that the at least one indication is indicative of the egress congestion at the port, limit the rate of ingress via the port.

A computer program product including non-transitory computer readable medium encoded with instructions that, when executed by a processor of a network device, the network device including a plurality of ports including a port configured to egress data from the port at an egress rate over a link connected to the port, and to ingress data into the port at an ingress rate over the link, cause the processor to: monitor at least one indication with respect to the egressing data in order to determine whether the at least one indication is indicative of egress congestion at the port; and upon determining that the at least one indication is indicative of the egress congestion at the port, limit the rate of ingress via the port.

In the above description of example embodiments, numerous specific details are set forth in order to provide a thorough understanding of the subject matter. However, it will be appreciated by those skilled in the art that some examples of the subject matter may be practiced without these specific details. In other instances, well-known features have not been described in detail so as not to obscure the subject matter.

It will also be appreciated that various features of the subject matter which are, for clarity, described in the contexts of separate embodiments may also be provided in combination in a single embodiment. Conversely, various features of the subject matter which are, for brevity, described in the context of a single embodiment may also be provided separately or in any suitable subcombination.

It will further be appreciated by persons skilled in the art that the presently disclosed subject matter is not limited by what has been particularly shown and described hereinabove. Rather the scope of the subject matter is defined by the appended claims and equivalents thereof:

What is claimed is:

1. A method performed by a network device, comprising:
at the network device:
ingressing data, including read commands from an initiator device soliciting data from a target device and transfer ready commands from the target device, into a port at a rate of ingress over a link connected to the port, wherein the port is configured to support a Fibre Channel protocol;
egressing data, including the data solicited from the target device, from the port at a rate of egress over the link;
monitoring at least one indication with respect to the data that is egressing in order to determine whether the at least one indication is indicative of egress congestion at the port of the network device, wherein the monitoring includes (i) monitoring for extreme delay using a counter that indicates a cumulative number of times that the link is reset by Fibre Channel link resets transmitted by the port, wherein the Fibre Channel link resets reinitialize buffer-to-buffer transmit-receive credits for the link, and (ii) using a second counter that indicates a number of times the port waits to transmit longer than a configurable amount; and
upon determining that the at least one indication is indicative of the egress congestion at the port, including determining occurrence of the extreme delay when the counter exceeds a predetermined value and determining when the number of times the port waits to transmit longer than the configurable amount as indicated when the second counter is above a configurable value, limiting the rate of ingress via the port by limiting the rate of ingress with respect to the read commands and the transfer ready commands.

2. The method of claim 1, wherein due to said limiting the rate of ingress via the port, the rate of egress via the port is lower than if said limiting the rate of ingress via the port were not performed, and consequently the egress congestion is prevented or reduced for the port.

3. The method of claim 1, further comprising, upon determining that the at least one indication is indicative of the egress congestion at the port:
   determining whether a previously applied limit on the rate of ingress on the port should be retained;
   if the previously applied limit on the rate of ingress should be retained, retaining the previously applied limit on the rate of ingress, otherwise, not retaining the previously applied limit on the rate of ingress;
   determining whether a previously applied limit on the rate of ingress at the port should be tightened; and
   if previously applied limit on the rate of ingress should be tightened, tightening the previously applied limit on the rate of ingress, otherwise not tightening the previously applied limit.

4. The method of claim 1, further comprising, upon determining that the at least one indication is not indicative of the egress congestion at the port:
   determining whether a previously applied limit on the rate of ingress on the port should be removed;
   if the previously applied limit on the rate of ingress should be removed, removing the previously applied limit on the rate of ingress;
   determining whether the previously applied limit on the rate of ingress should be loosened; and
   if the previously applied limit on the rate of ingress should be loosened, loosening the previously applied limit on the rate of ingress.

5. The method of claim 4, further comprising, upon determining that the at least one indication is not indicative of the egress congestion at the port:
   determining whether the previously applied limit on the rate of ingress should be retained; and
   if the previously applied limit on the rate of ingress should be retained, retaining the previously applied limit on the rate of ingress.

6. The method of claim 1, wherein said limiting the rate of ingress via the port includes:
   beginning to apply a limit on the rate of ingress when no limit on the rate of ingress is currently being applied,
   retaining a previously applied limit on the rate of ingress, or
   tightening the previously applied limit on the rate of ingress.

7. The method of claim 1, further comprising: upon determining that the at least one indication is not indicative of egress congestion at the port,
   not beginning to apply a limit on the rate of ingress when no limit on the rate of ingress is currently being applied,
   removing a previously applied limit on the rate of ingress,
   loosening the previously applied limit on the rate of ingress, or
   retaining the previously applied limit on the rate of ingress.

8. The method of claim 1, wherein said limiting the rate of ingress via the port includes setting, retaining or raising a minimum spacing between buffer-to-buffer credits.

9. The method of claim 1, wherein the port supports a Fibre Channel over Ethernet protocol, and wherein said limiting the rate of ingress via the port includes at least one of:
   setting, retaining, or raising a minimum spacing between a pause with non-zero quanta and a pause with zero quanta;
   setting, retaining, or raising a minimum for the non-zero quanta in the pause with the non-zero quanta; or
   setting, retaining, or raising a minimum frequency for sending the pause with the non-zero quanta.

10. The method of claim 1, wherein the network device is a basic storage area network (SAN) switch or a director SAN switch, operating in switch mode or N-port virtualization mode, and the port is connected via the link to an end device.

11. The method of claim 1, wherein the network device communicates using at least one of: a small computer system interface (SCSI) protocol, a non-volatile Memory Express (NVMe) protocol, or a FICON protocol, and wherein said limiting the rate of ingress via the port includes limiting ingress rate via the port of at least one of: read commands or transfer ready messages.

12. A network device comprising:
   a plurality of ports including a port configured to support a Fibre Channel protocol and to ingress data, including read commands from an initiator device soliciting data from a target device and transfer ready commands from the target device, into a port at a rate of ingress over a link connected to the port, and configured to egress data, including the data solicited from the target device, from the port at a rate of egress over the link;
   circuitry, including memory circuitry and processing circuitry coupled to each other and to the plurality of ports, the circuitry configured to:
      monitor at least one indication with respect to the data that is egressing data in order to determine whether the at least one indication is indicative of egress congestion at the port by (i) monitoring for extreme delay using a counter that indicates a cumulative number of times that the link is reset by Fibre Channel link resets transmitted by the port, wherein the Fibre Channel link resets reinitialize buffer-to-buffer transmit-receive credits for the link, and (ii) using a second counter that indicates a number of times the port waits to transmit longer than a configurable amount; and
      upon determining that the at least one indication is indicative of the egress congestion at the port, including determining occurrence of the extreme delay when the counter exceeds a predetermined value and determining when the number of times the port waits to transmit longer than the configurable amount as indicated when the second counter is above a configurable value, limit the rate of ingress via the port by limiting the rate of ingress with respect to the read commands and the transfer ready commands.

13. The network device of claim 12, wherein when the circuitry limits the rate of ingress via the port, the rate of egress via the port is lower than if said rate of ingress via the port were not limited by the circuitry, and consequently the egress congestion is prevented or reduced for the port.

14. The network device of claim 12, wherein the circuitry is adapted, upon determining that the at least one indication is indicative of egress congestion at the port to perform at least one of:
  begin to apply a limit on the rate of ingress when no limit on the rate of ingress is currently being applied,
  retain a previously applied limit on the rate of ingress, or tighten the previously applied limit on the rate of ingress.

15. The network device of claim 12, wherein the circuitry is further adapted, upon determining that the at least one indication is not indicative of egress congestion at the port, to perform at least one of:
  not begin to apply a limit on the rate of ingress when no limit on the rate of ingress is currently being applied;
  remove a previously applied limit on the rate of ingress;
  loosen the previously applied limit on the rate of ingress; or
  retain the previously applied limit on the rate of ingress.

16. The network device of claim 12, wherein the network device communicates using at least one of: a small computer system interface (SCSI) protocol, a non-volatile Memory Express (NVMe) protocol, or a FICON protocol, and wherein the rate of ingress includes at least one of: ingress rate of read commands, or ingress rate of transfer ready messages.

17. The network device of claim 12, wherein the network device is a storage area network (SAN) switch or a director SAN switch, operating in switch mode or N-port virtualization mode, and the port is connected via the link to an end device.

18. A computer program product including non-transitory computer readable medium encoded with instructions that when executed by a processor of a network device, the network device including a plurality of ports including a port configured to support a Fibre Channel protocol and to ingress data, including read commands from an initiator device soliciting data from a target device and transfer ready commands from the target device, into a port at a rate of ingress over a link connected to the port, and configured to egress data, including the data solicited from the target device, from the port at a rate of egress over the link, cause the processor to:
  monitor at least one indication with respect to the data that is egressing data in order to determine whether the at least one indication is indicative of egress congestion at the port by (i) monitoring for extreme delay using a counter that indicates a cumulative number of times that the link is reset by Fibre Channel link resets transmitted by the port, wherein the Fibre Channel link resets reinitialize buffer-to-buffer transmit-receive credits for the link, and (ii) using a second counter that indicates a number of times the port waits to transmit longer than a configurable amount; and
  upon determining that the at least one indication is indicative of the egress congestion at the port, including determining occurrence of the extreme delay when the counter exceeds a predetermined value and determining when the number of times the port waits to transmit longer than the configurable amount as indicated when the second counter is above a configurable value, limit the rate of ingress via the port by limiting the rate of ingress with respect to the read commands and the transfer ready commands.

19. The computer program product of claim 18, wherein:
  the instructions to cause the processor to monitor include instructions to cause the processor to:
    measure one or more of the at least one indication;
    calculate one or more the of the at least one indication;
    obtain one or more of the at least one indication;
    determine one or more of the at least one indication by performing analytics;
    obtain one or more values;
    compare one or more of the at least one indication to the one or more values;
    obtain a result of one or more comparisons of one or more indications to one or more values;
    determine one or more statuses of one or more of: data dropping, port shutdown, congestion isolation or virtual output queues; or
    provide a conclusion regarding whether the at least one indication is indicative of egress congestion; and
  the instructions to cause the processor to limit include instructions to cause the processor to:
    determine whether or not ingress rate limiting is to be applied;
    measure a current ingress rate;
    calculate the current ingress rate;
    obtain the current ingress rate;
    compare the current ingress rate to an operating link rate;
    obtain a value;
    calculate a limit; or
    provide the limit for enforcement.

20. The computer program product of claim 18, wherein the network device is a storage area network (SAN) switch or a director SAN switch, operating in switch mode or N-port virtualization mode, and the port is connected via the link to an end device.

* * * * *